United States Patent
Jaworski et al.

(10) Patent No.: US 12,068,657 B2
(45) Date of Patent: Aug. 20, 2024

(54) SPEED CONTROL CONCRETE VIBRATOR

(71) Applicant: MINNICH MANUFACTURING COMPANY, INC., Mansfield, OH (US)

(72) Inventors: Paul Jaworski, Shorewood, IL (US); David Clute, Valley City, OH (US); Robert Minnich, Ashland, OH (US)

(73) Assignee: MINNICH MANUFACTURING COMPANY, INC., Mansfield, OH (US)

( * ) Notice: Subject to any disclaimer, the term of this patent is extended or adjusted under 35 U.S.C. 154(b) by 869 days.

(21) Appl. No.: 17/115,920

(22) Filed: Dec. 9, 2020

(65) Prior Publication Data

US 2021/0091626 A1 Mar. 25, 2021

Related U.S. Application Data

(63) Continuation of application No. 16/238,063, filed on Jan. 2, 2019, now Pat. No. 11,025,125.

(60) Provisional application No. 62/742,988, filed on Oct. 9, 2018, provisional application No. 62/613,257, filed on Jan. 3, 2018.

(51) Int. Cl.
*H02K 5/00* (2006.01)
*E04G 21/06* (2006.01)
*E04G 21/08* (2006.01)
*G08C 17/00* (2006.01)
*H02K 5/14* (2006.01)
(Continued)

(52) U.S. Cl.
CPC ............. *H02K 5/14* (2013.01); *E04G 21/066* (2013.01); *E04G 21/08* (2013.01); *G08C 17/00* (2013.01); *H02K 11/026* (2013.01); *H02P 7/00* (2013.01); *C08L 2205/02* (2013.01)

(58) Field of Classification Search
CPC ....... E04G 21/08; E04G 21/066; G08C 17/00; H02P 7/00
See application file for complete search history.

(56) References Cited

U.S. PATENT DOCUMENTS 3,021,442 A 2/1962 Rodak
3,549,130 A 12/1970 Briggs
(Continued)

OTHER PUBLICATIONS

International Search Report and Written Opinion mail date Apr. 30, 2019 from International Application No. PCT/US2019/012080, International Filing Date Jan. 2, 2019. Authorized officer Blaine R. Copenheaver. 19 pages.
Wyco, 995 Electric Motor Vibrator, printed Apr. 2, 2019, 6 pages, https://www.badgermeter.com/business-lines/wyco/995-electric-motor-vibrator/.
Oztec, Concrete Vibrating Motors—Electric, printed Apr. 2, 2019, 1 page, www.oztec.com/electric_power_units.htm.
(Continued)

*Primary Examiner* — Anshu Bhatia
(74) *Attorney, Agent, or Firm* — Vorys, Sater, Seymour and Pease LLP; Mark A Watkins

(57) ABSTRACT

A concrete vibrator system includes a concrete vibrator having a motor, a vibratory head that is actuated by the motor, and a controller that controls the motor. The concrete vibrator system may also include one or more remote devices or servers that wirelessly communicate with the controller of the concrete vibrator. The remote device may monitor the speed output by the motor and the voltage supplied to the motor to achieve a set speed via the controller, and display information representative of the motor speed and motor voltage to the user. Moreover, the speed output by the motor may be controlled using voltage supplied to the motor.

32 Claims, 10 Drawing Sheets

(51) Int. Cl.
  *H02K 11/026* (2016.01)
  *H02P 7/00* (2016.01)

(56) References Cited

U.S. PATENT DOCUMENTS

| | | | |
|---|---|---|---|
| 4,171,190 | A | 10/1979 | Hudson |
| 5,126,607 | A | 6/1992 | Merriman, Jr. |
| 5,202,612 | A * | 4/1993 | Yoshida .................. E04G 21/08 |
| | | | 318/400.41 |
| D622,215 | S | 8/2010 | Heimbruch et al. |
| 2002/0152570 | A1 | 10/2002 | Hohlbein |
| 2004/0022581 | A1* | 2/2004 | Corbitt .................. E04F 21/245 |
| | | | 404/112 |
| 2005/0276156 | A1 | 12/2005 | Elsten |
| 2007/0167885 | A1 | 7/2007 | Moon |
| 2007/0201302 | A1 | 8/2007 | Lindley |
| 2007/0268128 | A1* | 11/2007 | Swanson .................. H04Q 9/00 |
| | | | 340/539.22 |
| 2012/0092948 | A1 | 4/2012 | Heimbruch et al. |
| 2016/0365769 | A1 | 12/2016 | Raczek et al. |
| 2017/0126100 | A1 | 5/2017 | Chou |

OTHER PUBLICATIONS

Multiquip, Flex-Shaft Vibrators, printed Apr. 2, 2019, 4 pages, www.multiquip.com/multiquip/flex-shaft-vibrators.htm.

Northrock Industries, Electric Vibrators, printed Apr. 2, 2019, 3 pages, www.northrockindustries.com/ElectricVibrators.

Wyco, Sure Speed 2.0 Electric Motor Vibrator—Badger Meter, printed Apr. 2, 2019, 7 pages, https://www.badgermeter.com/business-lines/wyco/sure-speed-20-electric-motor-vibrator/.

Wacker Neuson HMS, Modular Internal Vibrators for More Flexibility, printed Apr. 2, 2019, 2 pages, https://www.wackerneuson.us/en/products/concrete-technology/internal-vibrators/basic-line-internal-vibrators/.

Wyco, Flex Shaft Concrete Vibrators User Manual, Sure Speed 2.0 and 995, VBR-UM-02653-EN-02 (May 2018), 20 pages.

Multiquip, Operation and Parts Manual, Models CV1A, CV2A/2B, CV3A/3B Vibrator Motor, Revision #1 (Apr. 9, 2018), 34 pages.

Minnich, Flex Shaft Vibrators, Electric and Gasoline, 2015 Brochure, 4 pages.

Wyco Tool, Sure Speed Concrete Vibrator, Construction Equipment Brochure, Sep. 28, 2010, printed Apr. 2, 2019, 4 pages, https://www.constructionequipment.com/wyco-tool-sure-speed-concrete-vibrator.

* cited by examiner

US 12,068,657 B2

SPEED CONTROL CONCRETE VIBRATOR

CROSS-REFERENCE TO RELATED APPLICATIONS

This application is a continuation of pending U.S. patent application Ser. No. 16/238,063 filed Jan. 2, 2019, which claims priority to and the benefit of both U.S. Provisional Application No. 62/613,257 filed Jan. 3, 2018, and U.S. Provisional Application No. 62/742,988 filed Oct. 9, 2018, all of which are incorporated by reference herein in their entirety.

BACKGROUND

Concrete vibrators are used for consolidating concrete in a form at a construction site by vibrating the concrete before it sets. The vibration releases entrapped air, encourages a lower slump concrete to flow into corners of the form, thereby more completely filling the form and making more intimate contact with support structures such as rebar. Conventional vibrator motor speeds may vary from 11,000 to 17,000 rpms, yet these conventional concrete vibrators do not include a means for the operator to gauge the vibrator dynamics being imparted in the concrete. Thus, the energy produced by conventional vibrators is highly variable between equivalent units and may cause material damage in the concrete.

In addition, the quality of a concrete pour depends on a number of factors. Such factors may include, without limitation, the quality of raw materials, the water to cement ratio, the ratio of coarse to fine aggregate, the age of the concrete, the compaction of concrete, the temperature, the relative humidity at the concrete pour, the curing of concrete, etc. Unsatisfactory concrete mix is often delivered to a construction site, thereby resulting in unplanned delays and cost overruns, especially if the concrete has already been poured and must be removed. Conventional concrete vibrators, however, do not provide a means for the operator to assess the quality of a concrete mix to determine whether or not a concrete mix is suitable for a particular pour.

SUMMARY

In accordance with the present disclosure, a system for controlling speed of a concrete vibrator is disclosed. The system may include a controller affixed to the concrete vibrator and operable to control motor speed of the concrete vibrator, and a remote device configured to communicate with the controller to control motor speed of the concrete vibrator based on readings received from the controller. In some examples, the readings received from the controller include at least one of voltage draw of the concrete vibrator and actual motor speed. In some examples, the remote device includes at least one remote sensor that provides remote readings to the remote device; and in some of these examples, the remote device is configured to control motor speed of the concrete vibrator based on at least one of readings received from the controller and remote readings received from the at least one remote sensor. In some examples, the concrete vibrator includes at least one sensor that provides readings to the remote device; and in some of these examples, the remote device is configured to control motor speed of the concrete vibrator based readings received from at least one of the controller and at least one sensor of the concrete vibrator. In some examples, the controller is configured to increase motor torque in response to increase in voltage draw of the concrete vibrator. In some examples, the controller is configured to increase motor speed to match a specified speed in response to increase in voltage draw of concrete vibrator.

In some examples, the remote device is configured to communicate wirelessly with the controller; and in some of these examples, the system further includes a server configured to communicate wirelessly with at least one of the controller and the remote device. In some examples, the system further includes a server configured to communicate wirelessly with the controller; and in some of these examples, the server is configured download operational data from the concrete vibrator.

In some examples, the system includes one or more additional remote devices. In some of these examples, at least one of the one or more additional remote devices is configured to communicate wirelessly with the controller. In some of these examples, the remote device is configured to communicate wirelessly with the controller and at least one of the one or more additional remote devices is in wireless communication with the controller. In some of these examples, at least one of the one or more additional remote devices is a server configured to communicate wirelessly with the controller.

In some examples, the remote device is selected from the group consisting of a smart phone, a tablet, a laptop, a personal computer, a server, a wearable electronic device, an activity tracker, a vehicle based control device, a wired control device, and combinations of the same. In some examples, the remote device is operable to permit initiation of a concrete vibration operation; and in some of these examples, the remote device is configured to display real time information indicative of the concrete vibration operation. In some examples, the remote device includes a processor configured to receive drive voltage readings and motor speed readings from the controller and communicate motor control signals to the controller to adjust motor speed based on at least one of the drive voltage readings and motor speed readings.

In some examples, the remote device includes a user interface operable to permit initiation of a concrete vibration operation, and a processor configured to receive drive voltage readings and motor speed readings from the controller and communicate motor control signals to the controller to adjust motor speed based on at least one of the drive voltage readings and motor speed readings. In some of these examples, the remote device further includes a memory configured to store instructions to be executed by the processor to perform the vibration operation. In some of these examples, the user interface is configured to display real time information indicative of the concrete vibration operation. In some of these examples, the real time information includes a graphic of drive voltage and motor speed over time.

Also, in accordance with the present disclosure, a concrete vibrator is provided. The concrete vibrator may include a motor assembly operatively connected to a vibratory head and a controller affixed to the motor assembly, wherein the controller applies a drive voltage to the motor assembly and is operable to control motor speed output by the motor assembly based on the drive voltage fluctuations monitored by the controller. In some examples, the controller is configured to increase motor speed output by the motor assembly in response to increase in drive voltage.

In some examples, the concrete vibrator also includes a remote device configured to communicate with the controller to control motor speed of the motor assembly based on drive voltage readings received from the controller. In some of these examples, the remote device includes a processor configured to receive drive voltage readings and motor speed readings from the controller and communicate motor control signals to the controller to adjust motor speed based on at least one of the drive voltage readings and motor speed readings. And in some of these examples, the remote device further includes a memory configured to store instructions to be executed by the processor to perform the vibration operation. And in some of these examples, the instructions stored on the memory are based a comparison between a reference data and the drive voltage readings and motor speed readings. And in some of these examples, the concrete vibrator includes a server in wireless communication with at least one of the controller and the remote device, wherein the server is configured to update the reference data. And in some of these examples, the server is configured download operational data from the concrete vibrator and the reference data is compiled from operational data.

BRIEF DESCRIPTION OF THE DRAWINGS

The following figures are included to illustrate certain aspects of the present disclosure and should not be viewed as exclusive embodiments. The subject matter disclosed is capable of considerable modifications, alterations, combinations, and equivalents in form and function, without departing from the scope of this disclosure.

DETAILED DESCRIPTION

The present disclosure is related to concrete vibrators and, more particularly, to end covers and cages that can be used in concrete vibrator motors. The present disclosure is also related to control systems that control the speed output of concrete vibrator motors using feedback.

The embodiments described herein provide endcaps for concrete vibrators that permit air intake, inhibit water or contamination ingression three hundred degrees (360°) about a horizontal axis of the concrete vibrator, help dampen vibration to one or more handles of the concrete vibrator, isolate the handle(s) from electrical current, and act as shock absorbers to protect a motor assembly of the concrete vibrator from breaking or becoming distorted. Other embodiments described herein provide control systems for controlling or optimizing operation of the concrete vibrator via feedback obtained from one or more sensors.

Figure 1:
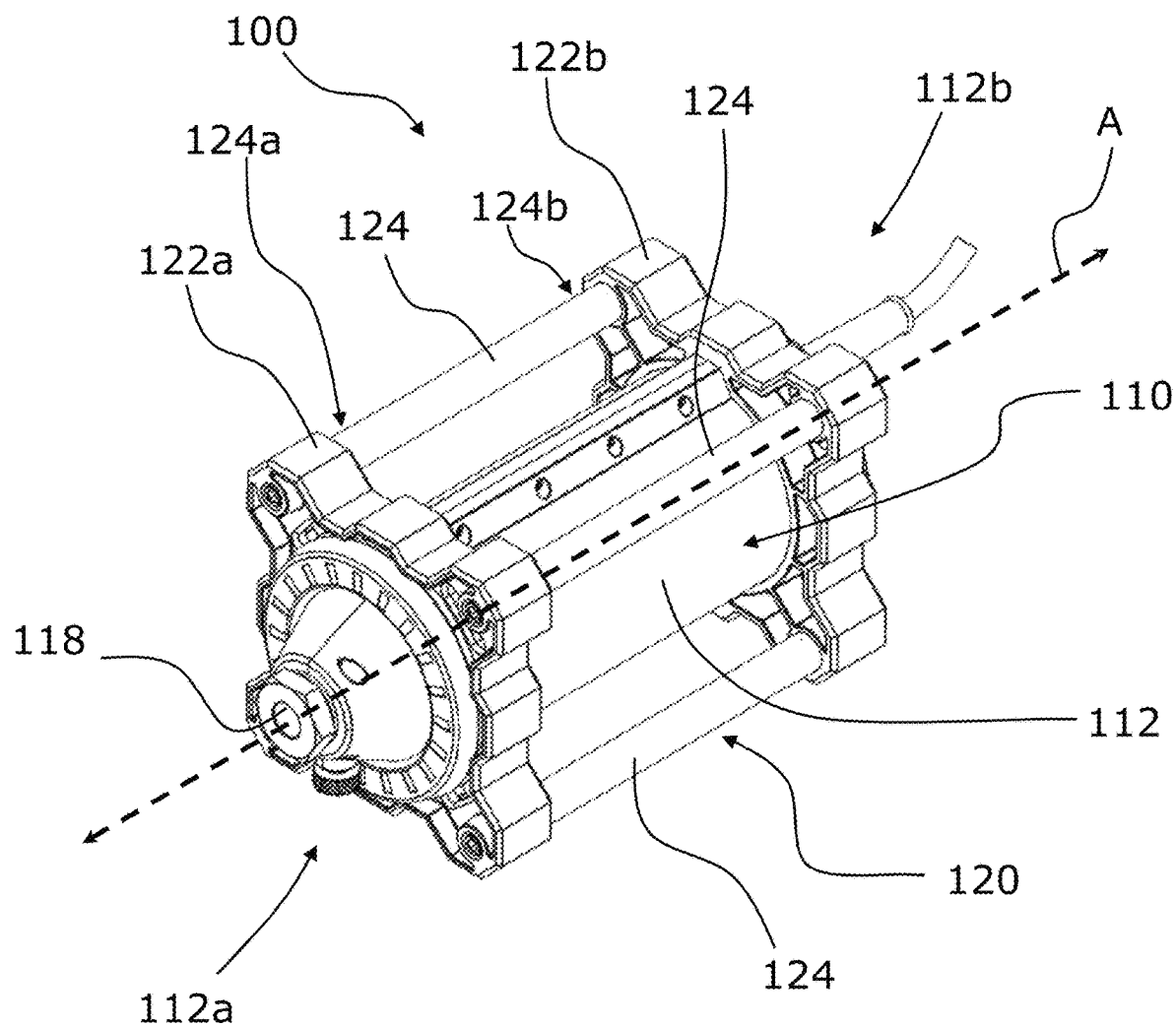
FIG. 1 is an isometric view of an exemplary concrete vibrator that may incorporate aspects of the present disclosure.

FIG. 1 is an isometric view of a concrete vibrator 100, according to one or more embodiments. In the illustrated embodiment, the concrete vibrator 100 extends along an axis A and includes a motor assembly 110 surrounded by a cage assembly 120. As illustrated, the cage assembly 120 is a protective cage that at least partially surrounds the motor assembly 110 and encapsulates it to protect from shock and to provide handle that is isolated from electrical shock and vibration. Moreover, when the cage assembly 120 is tightened (i.e., the endcaps tightened onto the handle tubes) onto the motor assembly 110, it creates a seal to inhibit water ingression into the motor assembly 110. While not illustrated, an arm or shoulder strap may be provided on the concrete vibrator, for example, on the motor assembly 110 and/or on the cage assembly, and the strap may be configured as a rigid handle type structure or configured as a non-rigid tether.

In the illustrated embodiment, the motor assembly 110 includes a housing or motor housing 112 and a motor pod (not illustrated) secured within the motor housing 112 via a plurality of brushes (not illustrated). The motor assembly 110 has a front end 112$a$ and a rear end 112$b$, and an input 118 disposed proximate to the front end 112$a$. The input 118 is configured to receive a shaft (not illustrated) to which a vibratory head (also not illustrated) may be connected. An operator of the concrete vibrator 100 may then actuate the motor pod to drive the shaft such that the vibratory head imparts vibration to a batch of concrete, for example, when the vibratory head is sunk into the concrete pour or concrete lift.

The motor assembly 110 further includes a user interface (not illustrated) that is in communication with the motor pod. In the illustrated embodiment, the user interface is on the rear end 112$b$ of the motor housing 112, however, it may be differently provided about the motor housing 112. An operator may control the concrete vibrator 100 via the user interface. Thus, the user interface may include a means whereby an operator may activate or deactivate the concrete vibrator 100, for example, the user interface may include one or more buttons, dials, or switches for turning the motor pod on or off. The user interface may also include a means for an operator to adjust the operation of the concrete vibrator 100. For example, the user interface may include buttons, dials, slides, switches, or other controls, that permit the operator to adjust an operating characteristic of the motor pod to change the vibration imparted by the vibratory head coupled thereto. The user interface may also include one or more indicators. Such indicators may be light emitting diodes (LEDs) or other types of visual indicators, or may include a screen capable of providing visual feedback via text or graphics. The user interface may also be configured to provide audible indicators via a speaker (not illustrated).

The motor pod may include a constant speed motor or a variable speed motor. Where the motor pod includes a variable speed motor, the user interface may include an input (e.g., a switch, dial, etc.) that affects the voltage supplied to the variable speed motor, such that the operator may adjust the speed output of the variable speed motor by changing or adjusting the input. For example, the user interface may include a dial that is engagable by the operator to change the variable speed motor's output speed between two (2) or more different speed settings. The motor pod is connected to a power source (not illustrated), such as a battery pack that may be removable or an external power supply. The motor pod is also connected to a control circuitry (not illustrated) in the form of analog or digital input signals, as discussed below.

In the illustrated embodiment, the cage assembly 120 includes a pair of endcaps 122a,122b and a plurality of handles 124 that extend between the endcaps 122a,122b. Here, the endcaps 122a,122b are identical and interchangeable (i.e., congruent); however, they may have the same or different geometries in other embodiments. Thus, while the first and second endcaps 122a,122b illustrated in FIG. 1 are arranged on the first and second ends 112a,112b of the motor housing 112, respectively, the first and second endcaps 122a,122b may instead be arranged at the second and first ends 112b,112a of the motor housing 112, respectively. In some embodiments, the endcaps 122a,122b operate as shrouds that seal the motor housing 112 and inhibit fluid ingression into the same while also permitting adequate airflow into the motor housing 112 to cool the motor pod therein.

As further described below, the endcaps 122a,122b (each individually referred to hereinafter as an endcap 122) also include a plurality of recesses, some of which are sized to receive handles 124. As illustrated, the handles 124 include opposing first and second ends 124a,124b that correspond to the first and second ends 112a,112b of the motor housing 112 and, when the endcaps 122 are disposed on the first and second ends 112a,112b of the motor housing 112, such recesses in the first endcap 122a are aligned with those of the second endcap 122b, and one of the handles 124 may be disposed between each of these pairs of recesses. More specifically, the first end 124a of the handle 124 is disposed within one such recess of the first endcap 122a and the second end 124b of the handle 124 is arranged within a corresponding recess of the second endcap 122b, and each of the handles 124 is secured between those pairs of recesses. In this manner, the handles 124 may be oriented substantially parallel with the motor housing 112 and define a cage structure that surrounds the motor assembly 110.

Figure 2:
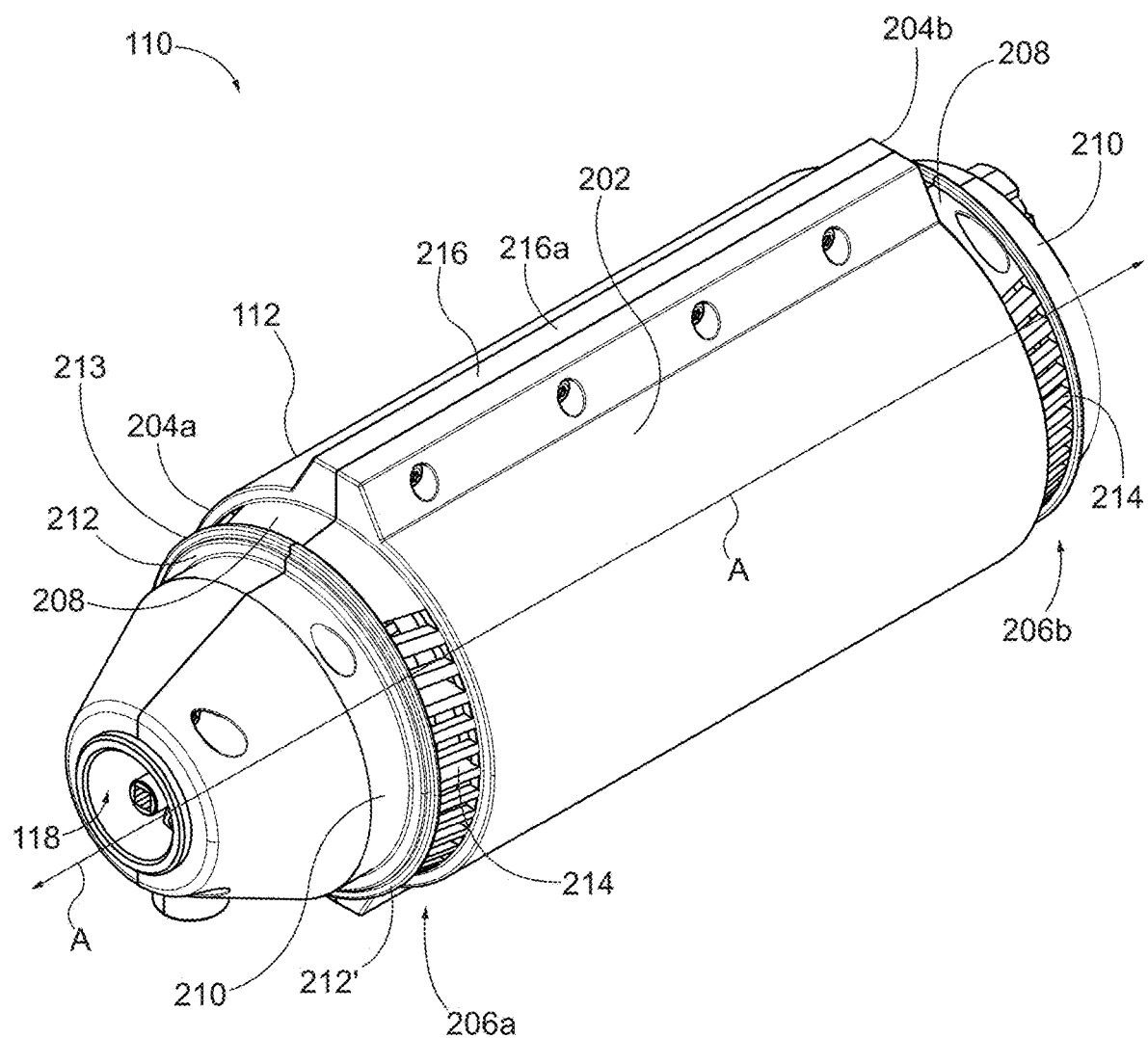
FIG. 2 an isometric view of an exemplary motor assembly of the concrete vibrator illustrated in FIG. 1.
Figure 3:
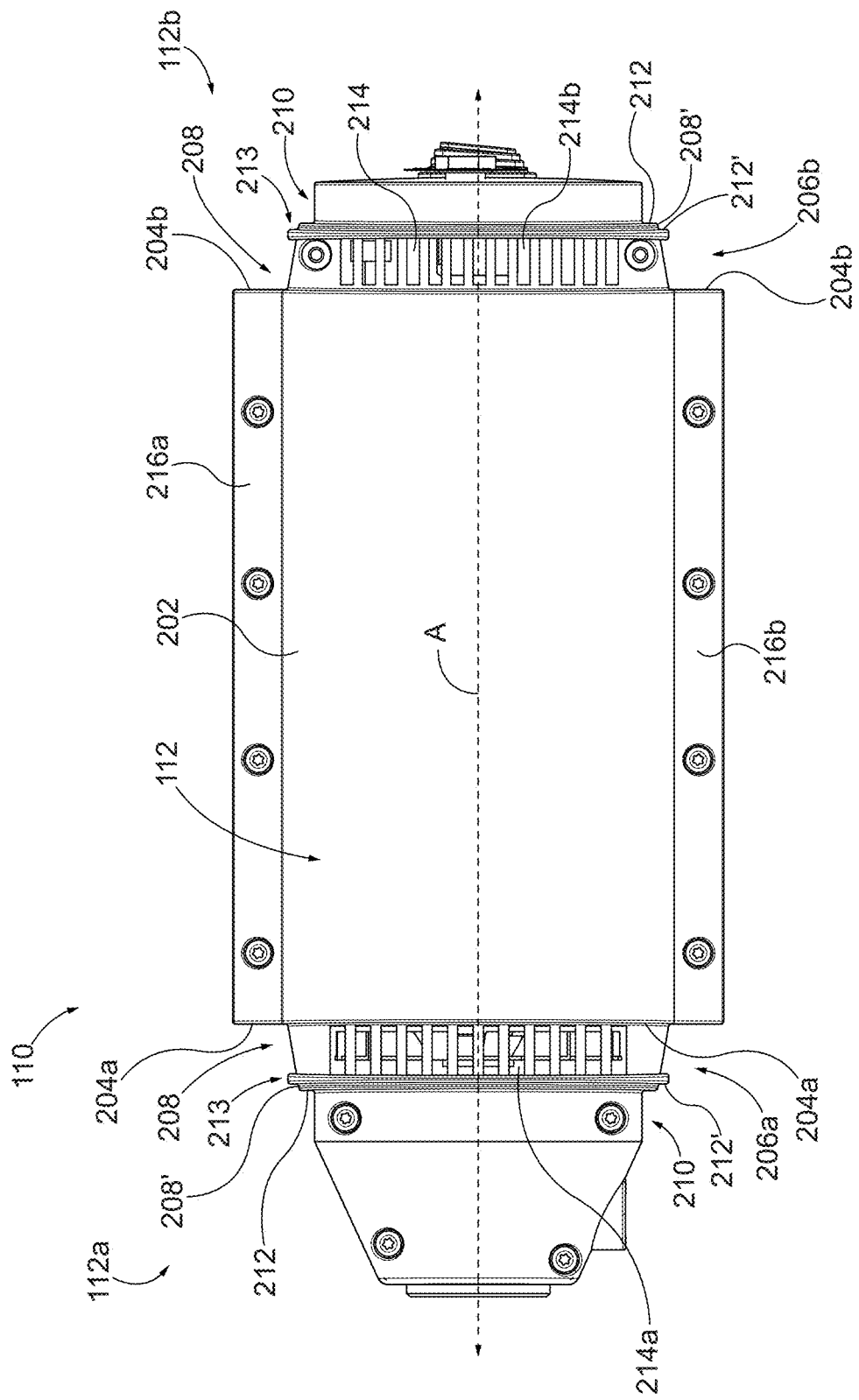
FIG. 3 is a side view of the motor assembly of FIG. 2.
Figure 4:
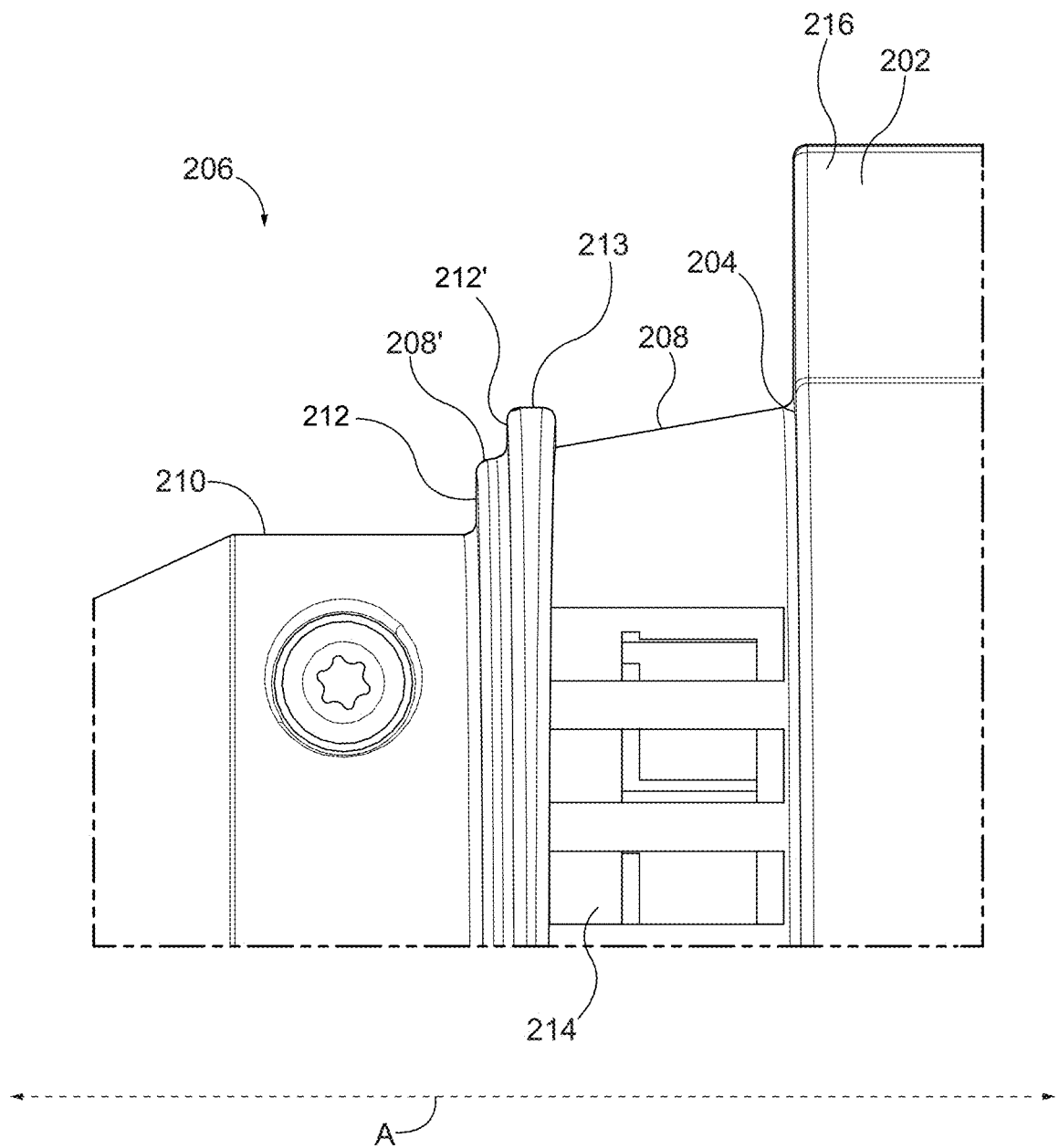
FIG. 4 is an exploded view of an exemplary hub of the motor assembly illustrated in FIGS. 3-4.

FIGS. 2-4 illustrate the motor assembly 110 that may incorporate the principles of the present disclosure. FIG. 2 is an isometric view of the motor assembly 110 according to one or more embodiments, whereas FIG. 3 shows a side view of the motor assembly 110 of FIG. 2. In addition, FIG. 4 shows a detailed view of a hub of the motor assembly 110 of FIG. 2, according to one or more embodiments. The depicted motor assembly 110 is just one example motor assembly that can suitably incorporate the principles of the present disclosure. Indeed, many alternative designs and configurations of the motor assembly 110 may be employed without departing from the scope of this disclosure.

As illustrated, the motor housing 112 of the motor assembly 110 is a shell that encases or encloses the motor pod, the brushes, and other internal components described below (e.g., microcontrollers, circuitry, etc.). The motor housing 112 includes a body 202 having a pair of faces 204, with a first face 204a corresponding to the first end 112a of the motor assembly 110 and a second face 204b corresponding with the second end 112b of the motor assembly 110. The body 202 interposes the first face 204a and the second face 204b and, in this embodiment, is generally cylindrical in shape; however, it may include other geometries without departing from the present disclosure. In addition, the first end 112a of the motor assembly 110 extends from the first face 204a and the second end 112b of the motor assembly 110 extends from the second face 204b.

In the illustrated embodiment, the input 118 is an opening that provides access to an output rotor (not illustrated) of the motor pod. The motor pod drives the output rotor, which is arranged within the motor housing 112 at the first end 112a of the motor assembly 110. Therefore, the first end 112a may have a different geometry than the second end 112b in order to accommodate the shaft (not illustrated) of the vibratory head (not illustrated) that may be inserted into the input 118 to operatively connect to the motor pod 114. Various means may be utilized to secure the shaft of the vibratory head to the input 118, for example, set screw assembly as illustrated in FIG. 1, a chuck assembly configured to tighten or clamp down on the shaft, etc.

The first and second ends 112a,112b extending from the faces 204 each include a hub 206 that is arranged to receive one of the endcaps 122, with a first hub 206a receiving the first endcap 122a and a second hub 206b receiving the second endcap 122b. The first hub 206a and the second hub 206b may be identically designed so that, for example, the second endcap 122b may instead be installed on the first hub 206b and vice versa, even where the faces 204 have different geometries. As further described below, the endcaps 122 abut the faces 204 when installed on the hubs 206.

FIG. 4 illustrates a detailed view of the hub 206, according to one or more embodiments. In particular, FIG. 4 illustrates the first hub 206a, and the second hub 206b may be similarly configured. In the illustrated embodiment, each of the hubs 206 includes an inner hub portion 208 and an outer hub portion 210. Here, the inner hub portions 208 are disposed proximate to the faces 204 of the body 202, whereas the outer hub portions 210 extend outward from the inner hub portions 208 along the axis A away from the body 202. The outer hub portions 210 may be similarly configured or, as illustrated, the outer hub portion 210 on the first end 112a may be differently configured than the outer hub portion 210 of the second end 112b. The outer hub portions 210 are smaller in diameter than the inner hub portions 208, thereby defining a hub face 212 that interposes the inner hub portion 208 and outer hub portion 210.

The hubs 206 may also include an annular shaped member 213. The annular shaped member 213 is optional and may be located at various positions on the hub 206. In the illustrated embodiment, the annular shaped member 213 is positioned on the inner hub portion 208, at an axial end thereof that is proximate to the junction from which the outer hub portion 210 extends from the inner hub portion 208. Here, the annular shaped member 213 is positioned on the inner hub portion 208, such that a segment 208' of the inner hub portion 208 extends axially outward (away from the motor housing 112 along the axis A) beyond the annular shaped member 213 and such that the hub face 212 is provided on the segment 208' of the inner hub portion 208. As further described below, the endcaps 122 abut the hub faces 212 when installed on the hubs 206. In this embodiment, the annular shaped member 213 defines a secondary hub face 212' that extends outward from and is larger in diameter than the hub face 212. Either or both of the inner hub portions 208 and the outer hub portions 210 may be differently configured, however. In other non-illustrated embodiments, for example, the annular shaped member 213 is positioned between the inner hub portion 208 and the outer hub portion 210, such that the hub face 212 is provided on the annular shaped member 213, which may or may not also include the secondary hub face 212'.

The motor assembly 110 is configured to permit circulation of airflow between the interior of the motor housing 112 and the ambient environment. Thus, the motor assembly 110 may include a plurality of vents 214 to facilitate air intake and air exhaust. The vents 214 may be provided at various locations on the motor housing 112 and, in the illustrated embodiment, the vents 214 are disposed on the hubs 206 thereof. The vents 214 may be differently disposed on the motor housing 112, however. Here, the vents 214 are formed radially about the inner hub portions 208 and define recesses or openings that extend substantially perpendicular to the axis A. A first grouping of vents 214a corresponds with the first hub 206a and a second grouping of vents 214b corresponds with the second hub 206b. In the illustrated embodiment, the first grouping of vents 214a are intake vents that permit air to flow into the motor assembly 110 to cool the motor pod 114, and the second grouping of vents 214b are exhaust vents that permit such air to exit the motor assembly 110. However, the vents 214 may be differently configured, for example, the first grouping of vents 214a and the second grouping of vents 214b may instead be configured to exhaust air and intake air, respectively, or the first grouping of vents 214a and the second grouping of vents 214b may be configured to both intake air and exhaust air. As further described below, the endcaps 122 cover the vents 214 (that would otherwise open radial to the axis A) and redirect air intake and exhaust along axially extending channels formed in the endcaps 122, to thereby prevent fluid from entering the motor assembly 110 while permitting air intake and exhaust.

In addition, the motor housing 112 may further include structures that add rigidity and strength, and inhibit rotation of the endcaps 122 when installed thereon. Here, the motor housing 112 includes a pair of struts 216 oriented along the axis A. In this embodiment, the struts 216 extend along the body 202 from the first face 204a to the second face 204b, with a top strut 216a oriented along a top side of the body 202 and a bottom strut 216b oriented along a bottom side of the body 202. The struts 216 may define a portion of the faces 204 and thus provide an abutment that inhibits rotation of the endcaps 122 when installed thereon as detailed below. The struts 216 need not extend along the length of the body 202 between the faces 204, however. For example, they may instead be configured as protrusions radially extending from the axis A that are located proximate to the faces 204 to inhibit rotation of the endcaps 122 in a similar manner.

Figure 5:
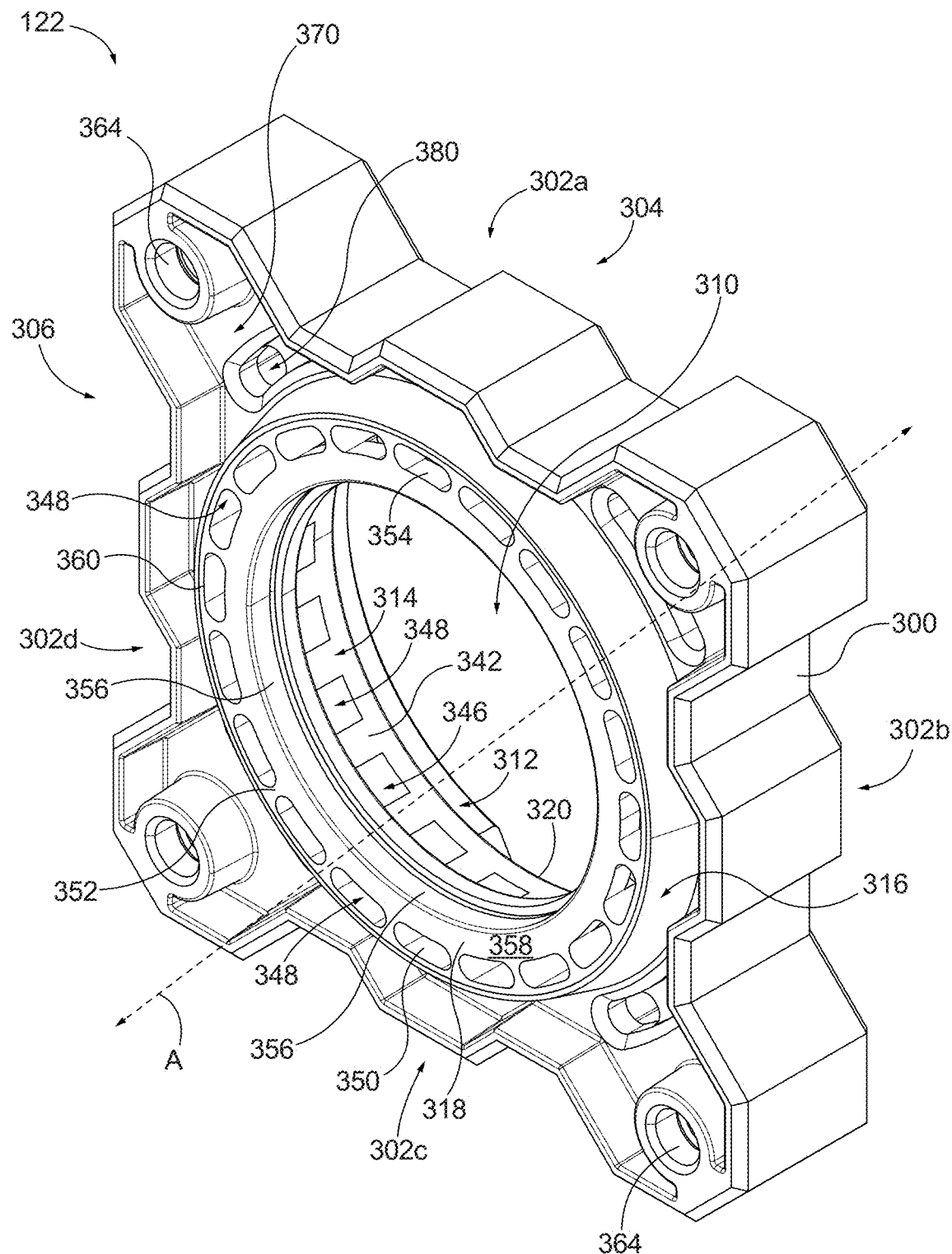
FIG. 5 is an isometric view of an exemplary endcap that may be utilized with the concrete vibrator illustrated in FIG. 1 and depicts an outer face thereof, according to one or more embodiments of the present disclosure.
Figure 6:
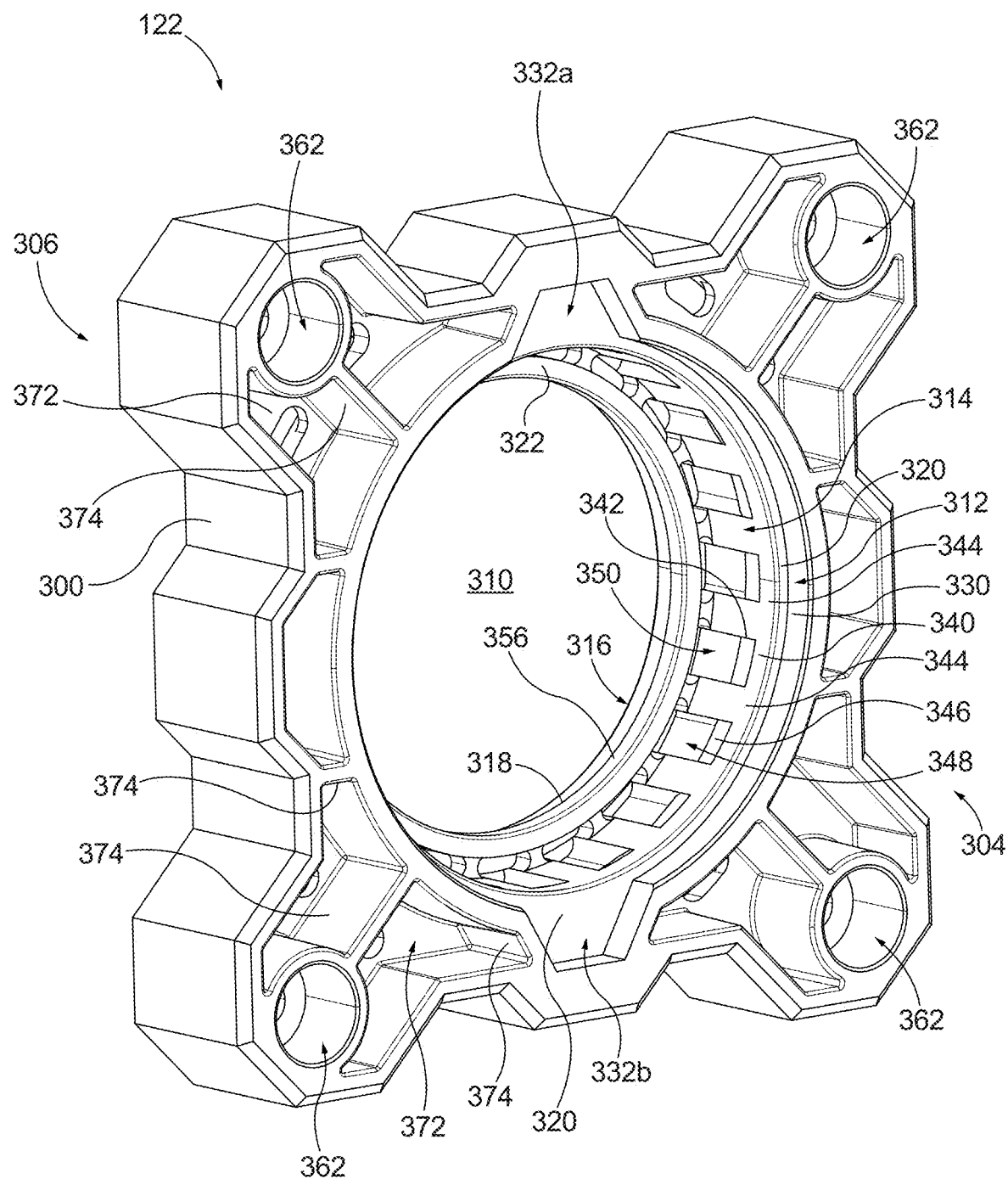
FIG. 6 is an isometric view of the endcap of FIG. 5 and depicts an inner face thereof according to one or more embodiments of the present disclosure.
Figure 7:
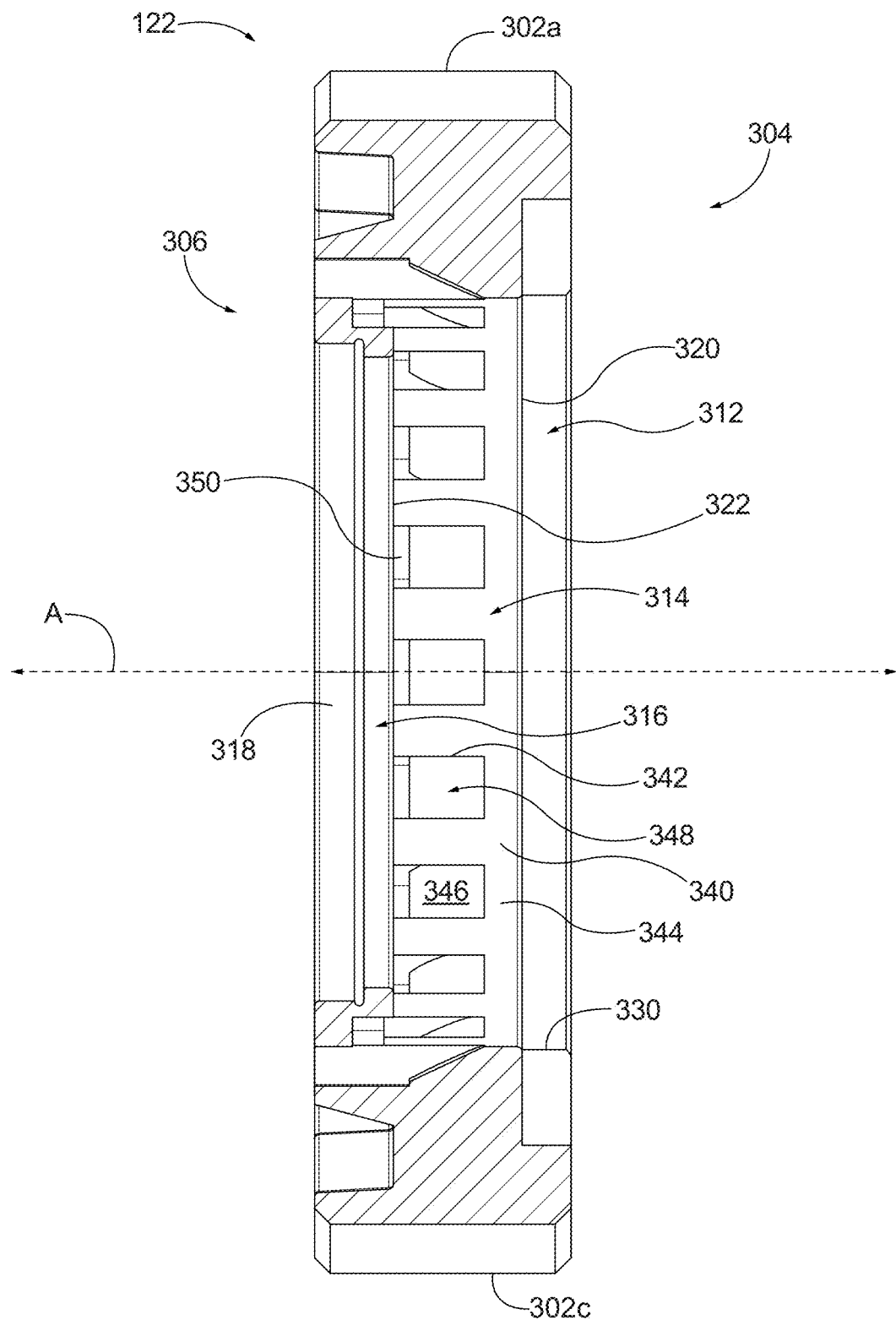
FIG. 7 is a cross-sectional side view of the endcap of FIGS. 5-6.

FIGS. 5-7 illustrates an exemplary endcap 122, according to one or more embodiments. In particular, FIG. 5 is a front isometric view of the endcap 122, whereas FIG. 6 is a rear isometric view of the endcap 122, and FIG. 7 is a cross sectional side view of the endcap 122. As mentioned above, the endcap 122 may be mounted on either the first or second end 112a,112b of the motor housing 112, which in turn reduces the number of parts needed to assemble the caged concrete vibrator 100. The endcap 122 operates as a shroud that permits airflow into and out of the vents 214 of the motor housing 112, while inhibiting fluid ingression into the vents 214, regardless of the orientation of the caged concrete vibrator 100 when the motor housing 112 is oriented substantially parallel with a horizontal plane (i.e., 360° about the hubs 206 when oriented in a vertical plane). In addition, the endcap 122 provides additional layers of electrical insulation between the operator and the electrical components inside the motor pod and provide shock absorption to protect the motor pod.

The endcap 122 may be manufactured from any number of materials such as, for example, polymers (e.g., thermoplastics, thermosets, etc.), fibers, adhesives, metals, composites, elastomers, etc. The endcap 122 may have various hardnesses, and in some example, ranges from forty (40) to ninety (90) on a durometer scale, but may be higher than ninety (90) in some examples. In one embodiment, the endcap 122 comprises an approximately ninety (90) durometer urethane. In some examples, the endcap 122 is made from TREXPRENE A88BU. However, other natural or synthetic polymers having the same or different hardnesses may be utilized. In other examples, natural rubber may be utilized. Moreover, various manufacturing techniques may be utilized to manufacture the endcap 122, for example, injection molding.

Generally, the end cap 122 includes a body 300 having at least one exterior side. In the illustrated embodiment, the body 300 of the endcap 122 is generally square shaped and thus includes four (4) sides 302a,302b,302c,302d that contact the ground or work surface and, in some environments, may be wet. In this manner, the four (4) sides 302a,302b, 302c,302d may maintain the motor assembly 110 in an elevated position so that it need not contact a wet surface. The endcap 122, however, may have different geometries without departing from the present disclosure. In addition, the sides 302a,302b,302c,302d are congruent in the illustrated embodiment but, in other embodiments, they are not. The endcap 122 also includes an inner face 304 (see FIG. 6) and an outer face 306 (see FIG. 5), with the inner face 304 being oriented towards the body 202 of the motor housing 112 when the endcap 122 is installed and the outer face 306 being oppositely oriented so that it faces away therefrom. The inner face 304 and the outer face 306 each lie in a plane that is substantially perpendicular to the sides 302a,302b, 302c,302d, and the inner face 304 and the outer face 306 each define an inner and outer envelope of the endcap 122, respectively.

The endcap 122 also includes a bore 310 that extends through the body 300 along the axis A, from the inner face 304 to the outer face 306. The bore 310 includes a plurality of concentric bore portions, at least some of which intimately receive the motor housing 112. As best illustrated in FIG. 5, the bore 310 comprises a first inner bore portion 312, a second inner bore portion 314, and an outer bore portion 316. In addition, a hub ring 318 is suspended concentrically within the outer bore portion 316, such that the hub ring 318 is concentric with the bore 310. As described below, the hub ring 318 includes a bore portion (or inner periphery) that receives the outer hub portion 210 of the motor housing 112, such that a surface of the hub ring's 318 bore portion is in contact with a surface of the outer hub portion 210 of the motor housing 112.

The first inner bore portion 312, the second inner bore portion 314, the outer bore portion 316, and the hub ring 318 have varying dimensions. In the axial dimension measured along the axis A, the first inner bore portion 312 begins at and opens into the inner face 304, extends outward axially therefrom into the bore 310, and terminates at a body abutment 320. Here, the body abutment 320 interposes the first inner bore portion 312 and the second inner bore portion 314, and contacts the face 204 of the motor housing 112 when the endcap 122 is installed onto the motor assembly 110 as hereinafter described. Continuing in the axial dimension along the axis A, the second inner bore portion 314 begins at the body abutment 320 and extends outward axially therefrom, further along the bore 310, and terminates at a hub abutment 322 of the hub ring 318. Here, the hub abutment 322 interposes the second inner bore portion 314 and the outer bore portion 316, and contacts the hub face 212 of the hub 206 when the endcap 122 is installed onto the motor assembly 110 as hereinafter described. Continuing in the axial dimension, the outer bore portion 316 begins at the hub abutment 322 and extends axially outward therefrom, further along the bore 310, and terminates at and opens into the outer face 306.

The first inner bore portion 312, the second inner bore portion 314, the outer bore portion 316, and the hub ring 318 may also have varying lateral dimensions as measured perpendicular to the axis A. For example, the first inner bore portion 312, the second inner bore portion 314, the outer bore portion 316, and the hub ring 318 may all have different diameters. Indeed, the diameter of any of the first inner bore portion 312, the second inner bore portion 314, the outer bore portion 316, and the hub ring 318 may expand or contract along the axial direction. In addition, any of the first inner bore portion 312, the second inner bore portion 314, the outer bore portion 316, and the hub ring 318 may include additional features and/or recesses as hereinafter described.

Here, the first inner bore portion 312 is arranged to intimately receive and encapsulate the face 204 of the motor housing 112 and form a seal there-between. In the illustrated embodiment, the first inner bore portion 312 includes a peripheral surface 330 that slides over the body 202 of the motor housing 112 when the endcap 122 is installed on the motor assembly 110. Also, the peripheral surface 330 may be sized to receive the body 202 such that a diameter of the peripheral surface 330 is approximately equal to the diameter of the body 202. Thus, the peripheral surface 330 may contact the body 202 in a tight-fitting fashion so as to form a seal. In addition, the first inner bore portion 312 may include one or more features or notches formed into the peripheral surface 330 that receive anti-rotation elements. Here, a pair of notches 332 are formed into the peripheral surface 330, with a top notch 332a arranged to receive the face 204 of the top strut 216a and a bottom notch 332b arranged to receive the face 204 of the bottom strut 216b. It will be appreciated, however, that the notches 332 may have various geometries depending on the geometry of the strut 216 corresponding therewith. Accordingly, when the endcap 122 is fully installed on the motor assembly 110, the peripheral surface 330 will contact the body 202 of the motor housing 112, and the body abutment 320 will contact the face 204 with the stop strut 216a being received in the top notch 332a and the bottom strut 216b being received within the bottom notch 332b. This arrangement forms a seal that inhibits fluid ingression between the motor housing 112 and the endcap 122.

The second inner bore portion 314 is arranged to be seated over the hub 206 of the motor housing 112, while providing one or more passageways that fluidly interconnect the vents 214 to the ambient environment that is external to the motor assembly 110. In the illustrated embodiment, the second inner bore portion 314 includes a hub contact portion 340 that is proximate to the body abutment 320 and a vent portion 342 that extends away therefrom towards the outer bore portion 316 and hub ring 318. The hub contact portion 340 has a peripheral surface 344 that is arranged to be seated on the inner hub portion 208 of the motor housing 112. Therefore, the peripheral surface 344 of the hub contact portion 340 may have an angular inclination, contour, or taper that corresponds with the inner hub portion 208 to ensure a complete and tight contact between the surfaces. Also in the illustrated embodiment, the peripheral surface 344 of the hub contact portion 340 covers only a portion of the vents 214 so as to not inhibit airflow therethrough. Here, the axial length of the hub contact portion 340 is less than the axial length of the vents 214 so as to not cause an obstruction. In other embodiments, however, the peripheral surface 344 of the hub contact portion 340 may include a taper or contour that creates a channel so as to not significantly obstruct airflow through the vents 214.

The vent portion 342 of the second inner bore portion 314 includes a vent surface 346 that is radially (or laterally) directed outward from the axis A and has larger diameters than the hub contact portion 340. In the illustrated embodiment, the vent surface 346 is an outwardly angled, inclined, or tapered surface that extends away from the peripheral surface 344 of the hub contact portion 340 and the inner face 304; however, in other embodiments, the vent surface 344 may be contoured with other geometries. Also, the vent portion 342 begins at an axial location along the axis A within the bore 310 such that, when the endcap 122 is installed on the motor assembly 110, the vent surface 346 covers the vents 214 without causing an airflow obstruction. Thus, when the endcap 122 is installed on the motor assembly 110, the outward taper of the vent surface 346 defines one or more channels 348 that are in fluid communication with the vents 214. As further described below, the one or more channels 348 are passageways that extend into and through the outer bore portion 316, terminate at one or more openings 360 in the outer face 306, and fluidly interconnect the vents 214 to the ambient environment that is external to the motor assembly 110.

The outer bore portion 316 is oriented proximate to the outer face 306 and axially outward along the axis A from the second inner bore portion 314. In addition, the outer bore portion 316 is oriented so that the hub ring 318 suspended therein intimately receives and forms a seal on the outer hub portion 210 of the motor housing 112, thereby facilitating fluid interconnection between the vents 214 and the ambient environment.

The outer bore portion 316 includes a channel surface 350 that extends around the periphery of the outer bore portion 316, from the vent surface 346 (of the vent portion 342 of the second inner bore portion 314) to the outer face 306. As illustrated, the hub ring 318 is suspended within the outer bore portion 316 by a plurality of supports 352. In addition to the hub abutment 322, the hub ring 318 includes an outer periphery 354, an inner periphery 356, and an exterior face 358 that, in the illustrated embodiment, is coplanar with the outer face 306 of the endcap 122; however, the exterior face 358 may instead be axially inward or outward of the outer face 306. Here, the supports 352 extend axially through the bore 310 along the axis A, from the hub contact portion 340, through the vent portion 342, and into the channel surface 350 of the outer bore portion 316, and thus provide support to the hub ring 318 by connecting to the outer periphery 354 thereof. In other embodiments, however, the supports 352 may be differently arranged. For example, they may instead extend radially inward from the channel surface 350 to attach to the outer periphery of the hub ring 318. Also, in the illustrated embodiment, there are sixteen (16) of the supports 352 that suspend the hub ring 318; however, in other embodiments, a different number of the supports 352 may be utilized that are similarly or differently configured.

The inner periphery 356 of the hub ring 318 is the inner bore surface of the hub ring 318 and is arranged to receive the outer hub portion 210 of the motor housing 112 such that a seal is formed there-between. More specifically, the inner periphery 356 of the hub ring 318 slides over the outer hub portion 210 and is arranged to be seated thereon when the endcap 122 is installed on the motor assembly 110. Thus, the inner periphery 356 corresponds in size to outer hub portion 210 of the motor housing 112. Here, the inner periphery 356 is sized to receive the outer hub portion 210 such that a diameter of the inner periphery 356 is approximately equal to a diameter of the outer hub portion 210. Thus, the inner periphery 356 surface may contact the outer hub portion 210 in a tight fitting fashion to form a seal. In some embodiments, locking features are provided on the inner periphery 356 of the hub ring 318 that mate with corresponding features of the outer hub portions 210, thereby locking the endcaps 122 onto the hub 206. In one embodiment, an annular groove is formed into the inner periphery 356 of the hub ring 318 and an annular ring configured to snap-fit within the foregoing annular ring is provided on the outer hub portions 210 of the motor housing 112. Also, when the endcap 122 is installed on the motor assembly 110, the hub abutment 322 of the hub ring 318 abuts or contacts the hub face 212 and/or the secondary hub face 212', which further seals the motor assembly 110 by providing an additional point of contact between the endcap 122 and the motor housing 112 at a location axially (along the axis A) inward from the point of contact between the inner periphery 356 of the hub ring 318 and the outer hub portion 210. In this manner, the motor assembly 110 is sufficiently vented to the ambient environment, as the channels 348 provide a passageway from the vents 214, through the vent portion 342 of the second inner bore portion 314, and into the outer bore portion 316 in-between the channel surface 350 and the outer periphery 354 of the hub ring 318.

The inner and outer faces 304,306 may each include various features. For example, the outer face 306 of the endcap 122 may include one or more openings 360 that correspond with the one or more channels 348. The openings 360 may be arranged on the plane of the outer face 306 or recessed inward thereof as illustrated. In even other embodiments, the channels 348 may extend outward of the outer face 306 so that the openings 360 thereof are disposed in a plane that is outward of the outer face 306. Here, the outer face 306 includes sixteen (16) openings 360 that each correspond to one of the channels 348, and the openings 360 are arranged within a plane that is axially inward of the outer face 306 as measured along the axis A. Also in the illustrated example, the openings 360 are openings are circumferentially arranged around and radially outward from the bore 310, and thereby define the hub ring 318 that may be integral with the material of the outer bore portion 316 in which it is suspended.

In addition, the inner face 304 may include one or more recesses 362 for receiving various components of the cage assembly 120. For example, the recesses 362 may be formed in the inner faces 304 of the endcaps to receive the handles 124 as described above. In some embodiments, the recesses 362 extend into the inner face 304 of the endcap 122, whereas in other embodiments the recesses 362 extend entirely through endcap 122, from the inner face 304 to the outer face 306. In addition, the recesses 362 may be arranged along a corner and/or an edge of the endcap 122 that is radially outward of the bore 310, and in some such embodiments, the recesses 362 may be equidistantly arranged at the corners and/or along the edges relative to each other. In the illustrated embodiment, the endcap 122 includes four (4) of the recesses 362. Here, the recesses 362 are arranged at each of the four (4) corners of the endcap 122 and extend through the endcap 122 from the inner face 304 to the outer face 306. Also, the recesses 362 are each radially equidistant from the axis A. Moreover, the recesses 362 may include corresponding holes or recesses formed into the outer face 306 that may be utilized for securing the handles 124 within the recesses 362. Here, for example, a plurality of mounting holes 364 are formed into the outer face 306 at locations thereof that correspond with the recesses 362 of the inner face 304. Thus, the illustrated embodiment includes four (4) of the mounting holes 362, with one of the mounting holes 364 positioned at each of the four (4) corners of the endcap 122, and each of the mounting holes 364 extends through the endcap 122 such that it is in communication with the recess 362. In this manner, a fastener (e.g., a screw, bolt, etc.) may be inserted through the mounting holes 364 and into the handles 124 that are set within the recesses 362. In this manner, the handles 124 may be secured in place.

Either or both of the endcaps 122 may also include one or more additional cavities, cutouts, or recesses, etc. For example, material may be removed from the inner face 304 and/or the outer face 306 to reduce the weight of the endcap 122 and/or enhance its aesthetics. In the illustrated example of FIG. 5, a cavity 370 is cut into the outer face 306. The cavity 370 is optional and, where provided, may operate to reduce weight and/or enhance the aesthetics of either or both of the endcaps 122. Here, the cavity 370 is substantially continuous about the hub ring 318, but in other examples, it may be non-continuous with walls or barriers remaining therein to segment the cavity 370 into two (2) or more compartments. As illustrated in FIG. 6, the inner face 304 also includes a cavity 372. Unlike the cavity 370 formed in the outer face 306, however, the cavity 372 of the inner face 304 is compartmentalized (or divided) into several subcavities via a plurality of walls 374. The walls 374 provide structural support to (and enhance the strength of) the endcap 122, but the walls 374 are optional and need not be included in other non-illustrated examples. The outer face 306 may also include one or more additional cutouts or recess features. In the illustrated embodiment, for example, the endcap 122 includes cutout features 380 at each of the four (4) corners of the endcap 122, which extend through the endcap 122 from the outer face 306 through the inner face 304. The cutout features 380 are optional, and in the illustrated embodiment, each of the cutout features 380 includes a pair of openings, which also function to reduce weight and/or enhance aesthetics.

In embodiments where the endcaps 122 are manufactured from non-conductive materials, such as a thermoplastic, the operator will be further insulated or shielded from the electrical components of the caged concrete vibrator 100 (e.g., the motor pod and/or the brushes) by at least one (1) component. Further, in embodiments where both the motor housing 112 and/or the endcaps 122 comprise non-conductive materials, the operator will be further insulated or shielded from the electrical components of the caged concrete vibrator 100 (e.g., the motor pod and/or brushes) by at least two (2) separate components. Moreover, where the endcaps 122 comprise thermos-plastics or other relatively soft materials, the operator will be protected from sharp, jagged, and/or otherwise potentially hazardous edges that are typically included in conventional devices.

Figure 8:
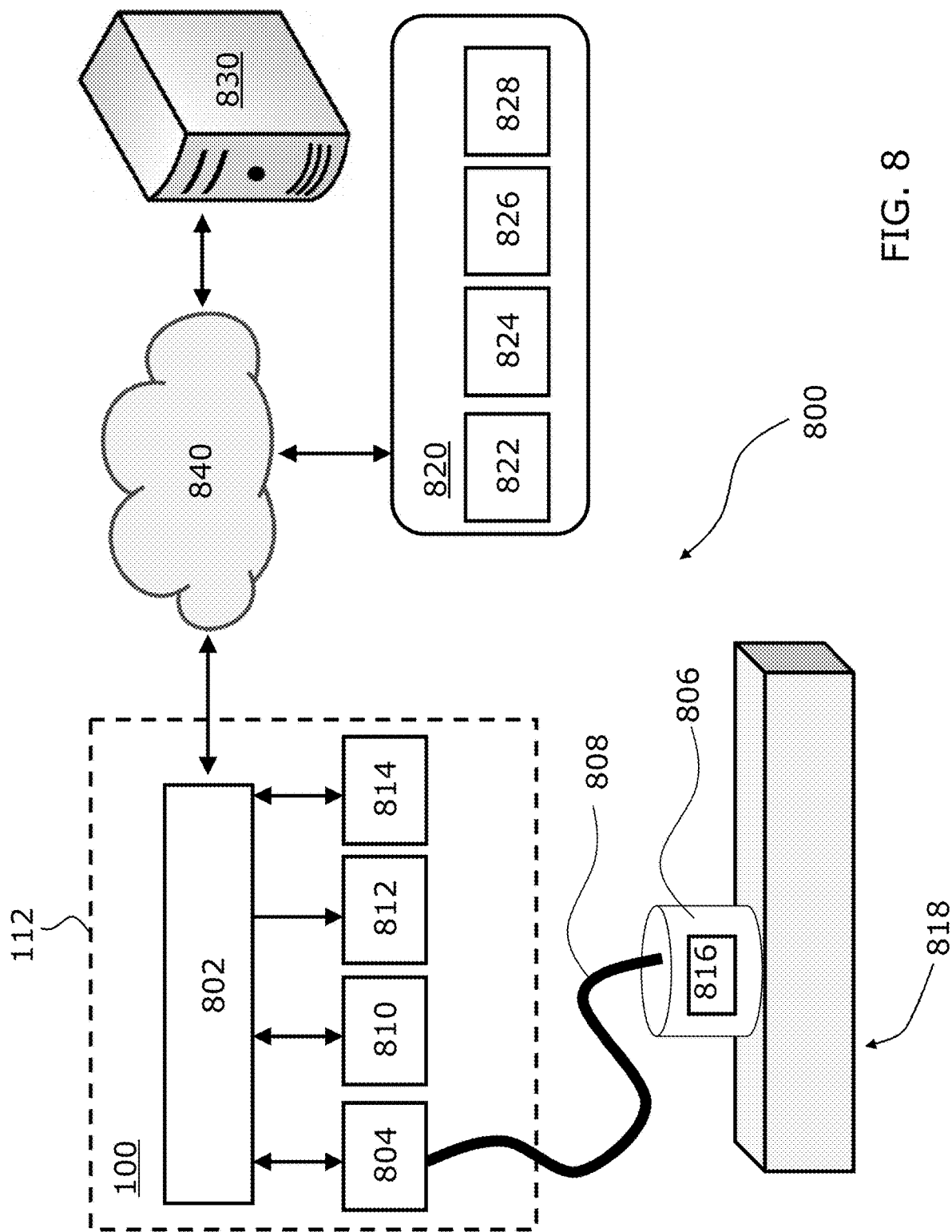
FIG. 8 is a schematic block diagram of an exemplary concrete vibrator system that may be utilized with the concrete vibrator of FIG. 1, according to one or more embodiments.
Figure 9:
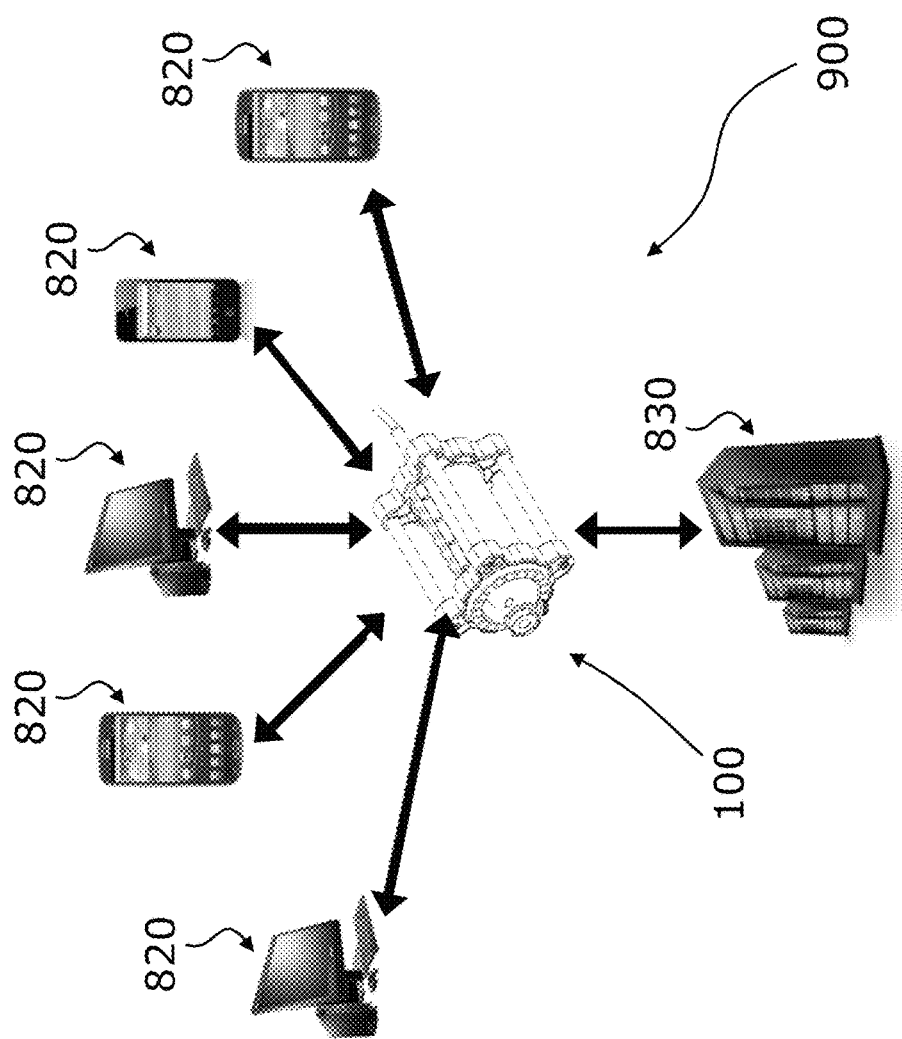
FIG. 9 is a schematic block diagram of an alternate concrete vibrator system that may be utilized with the concrete vibrator of FIG. 1, according to one or more embodiments.

Also disclosed herein are systems for controlling and/or monitoring the concrete vibrator 100. For example, the concrete vibrator 100 may be included in a system, whereby the concrete vibrator 100 is controlled and/or monitored by one or more other devices. FIG. 8 is a schematic block diagram of an exemplary system 800 for controlling and/or monitoring the concrete vibrator 100 via one or more devices over a network, according to one or more embodiments. FIG. 9 is a schematic block diagram of an exemplary system 900 for controlling and/or monitoring the concrete vibrator 100 via one or more devices in direct wireless connection therewith, according to one or more embodiments. While these figures illustrate the concrete vibrator 100 being wirelessly controlled, for example, over a network, the concrete vibrator 100 may also or instead be controlled by a control device that is wired to the concrete vibrator 100. Thus, the concrete vibrator 100 may be configured for wired and/or wireless control.

Turning to FIG. 8, the system 800 may be utilized to connect the concrete vibrator 100 to one or more mobile or remote devices. In this manner, an operator may remotely operate the concrete vibrator 100. In addition, an operator may also remotely monitor the quality of the concrete mix as the vibratory head of the concrete vibrator 100 imparts vibration into the concrete mix, and this monitoring may take place by an operator at a construction site or via another interested party at a remote location relative to the construction site. Moreover, the system 800 will enable the operator, or other interested parties, to capture useful data about a particular concrete mix before being poured, as detailed below.

As illustrated, the system 800 may include a controller 802. In the illustrated embodiment, the controller 802 is provided with the concrete vibrator 100 to control a motor 804 thereof. The controller 802 may have various wired and/or wireless communication ports for integrating various external or internal components therewith. For example, a power source (not illustrated) may be connected to the controller 802 and supplies power to the motor 804 though the controller 804, such that the controller 802 may adjust or control the amount of power applied or ultimately supplied to the motor 804. The power source may include various types of power sources, including a hard-wired power source or a battery, etc. Where utilized, the battery may be rechargeable or non-rechargeable, and the battery may be fixed to the concrete vibrator 100 or removable (and replaceable) therefrom. In addition, the controller 802 may have one or more processors, memory (RAM and/or storage), clocks or timers, display devices, and other components typically utilized with various sensor systems and associated controllers. For example, the controller 802 may be configured to measure the amount of power that it applies to the motor 804 and may also be configured to detect the speed at which the motor 804 is operating, for example, via a speed sensor (not illustrated) provided on the motor 804 shaft; and, as discussed below, the controller 802 may be configured as a closed loop feedback system that will measure the motor speed of the motor 804 and adjust the driving voltage applied to the motor 804 to either maintain a steady speed for a variable load or provide a variable speed for a fixed load.

Here, the controller 802 is hard wired to the motor 804 and secured therewith inside the motor housing 112 of the concrete vibrator 100. The concrete vibrator 100 also includes a vibratory head 806 that is connected to the motor 804 via a shaft, such as a flexible shaft 808 as represented in FIG. 8. Here, the vibratory head 806 is illustrated as being dipped or inserted into an exemplary cement or concrete pour 818. The vibratory head 806 may include various internal and/or external sensors (not illustrated) that may be in wired or wireless communication with the controller 802. In some embodiments, a sock or sheath (not illustrated) is provided over the vibratory head 806, and such sock or sheath may include sensors as hereinafter described. In some embodiments, a form is provided around the concrete pour 818, and vibratory devices with sensors are placed around the form (or integrated into the form) and controlled as disclosed herein. In some embodiments, sensor pods may be added into the concrete pour 818 and provide various types of data and feedback, for example, information regarding the vibration imparted to the concrete pour 818, the water content of the concrete pour 818, etc., and such pods may integrate into the system 800 as disclosed herein; and in some examples, the pods may also include vibratory devices that are controllable as disclosed herein. Where utilized in the system 800, the pods may remain within the concrete pour 818 after the concrete has set to thereafter communicate (e.g., continuously, or at certain time intervals, or upon occurrence of a certain event or failure mode, etc.) with various components of the system 800 to provide various types of data, for example, as to the quality of the concrete, its structural integrity, internal cracks or weaknesses, etc.

The system 800 may also include one or more user interfaces for interacting with, monitoring, and otherwise controlling the concrete vibrator 100, and such user interfaces may be provided on the concrete vibrator 100 and/or on other remote or mobile devices as detailed below. Thus, such user interface may be integral with the concrete vibrator 100 (e.g., on the motor housing 112 thereof), it may be a controller that is connected to the concrete vibrator 100 via a wire or cord, it may be a controller in wireless communication with the concrete vibrator 100, or any combination thereof may be utilized. In this regard, FIG. 8 also illustrates exemplary aspects of a user interface that is connected to the controller 802 and integrated into the concrete vibrator 100. In this example, the user interface (of the concrete vibrator 100) is hard wired to the controller 802 and includes one or more user inputs 810, whereby the operator may utilize the user inputs 810 to turn power on/off the motor 804 and/or to adjust the speed of the motor 804 and the vibration that the vibratory head 806 imparts to the concrete pour 818. Also, the user interface (of the concrete vibrator 100) includes an indicator screen 812 hard wired to the controller 802. In some examples, the indicator screen 812 includes one or more speakers or devices configured to produce audible feedback. Here, the indicator screen 812 provides the operator with feedback as to the status of the concrete vibrator, for example, notification as to the speed setting of the motor 804, whether the motor 804 is over-heating, whether the motor 804 is on or off, power consumption of the motor 804, characteristics of the concrete pour 818, etc. In some examples, the user interface is instead provided on a device that is connected to the concrete vibrator 100 via a wire, and in even other examples, two or more user interfaces are provided, for example, the user interface integral with the concrete vibrator 100 together with a wired device and/or a wireless device.

The system 800 may also be configured to measure or sense internal or external characteristics or operating conditions of the concrete vibrator 100. For example, the controller 802 may be configured to monitor an electrical load on the motor 804 and accordingly match motor torque to motor load and provide feedback to the operator regarding the same. The controller 802 may also be configured to monitor the speed at which the motor 804 drives the vibratory head 806, and provided feedback to the operator regarding the same. Accordingly, the system 800 may be configured to provide the operator with real-time feedback regarding the impedance and speed of the motor 804. In some embodiments, this real-time feedback is provided as visual feedback, for example, in the form of a graph, a graphic, a concrete index value or score, etc., whereas in other embodiments, the real-time feedback may include other types of feedback such as audible feedback. As more fully described below, the operator may utilize this real-time feedback to test the quality of a particular concrete mix and/or to determine when the vibratory head 806 has imparted a sufficient amount of vibration to a particular concrete mix.

In addition, the system 800 may include one or more sensors for measuring various other operational characteristics and/or environmental characteristics of the concrete vibrator 100, through which the operator may be provided real-time feedback representative of any or all of these characteristics. Thus, the system 800 may monitor operation of the concrete vibrator 100 and/or the ambient environment in which the concrete vibrator 100 operates. For example, the system 800 may include one or more sensors for measuring ambient temperature, ambient humidity, ambient atmospheric pressure, ambient sunlight, altitude, orientation of the concrete vibratory 100 with respect to a level surface, internal temperature of the concrete vibrator 100 (e.g., of the motor 804), presence of a sock or sheath on the vibratory head 806, whether the vibratory head 806 is located in a concrete mix (and/or its depth therein), moisture content of the concrete mix, chemical composition of concrete mix, temperature of the concrete mix, etc.

In one example embodiment, the concrete vibrator 100 includes a first sensor 814 provided on or within the motor housing 112 and a second sensor 816 provided on or within the vibratory head 806 (or on or within a sock/sheath thereof). Here, the first sensor 814 is hard wired to the controller 802 and the second sensor 816 is in wireless communication with the controller 802; however, either or both of the first and second sensors 814,816 may be hard-wired or wireless. Where the second sensor 816 is in wireless communication with the controller 802, it may include a power source such as a rechargeable battery that is disposed (permanently or interchangeably) within the vibratory head 806 (or on or within a sock/sheath thereof). The second sensor 816 may instead be hard wired to the controller 802, for example, through the flexible shaft 808. As mentioned above, the first sensor 814 and/or the second sensor 816 may be provided to measure various operational and/or environmental parameters. For example, the first sensor 814 and/or the second sensor 816 may be configured to measure operating speed of the motor 804, and such data may be communicated to the controller 802. Moreover, one or more additional sensors may be provided on or within the motor housing 112 and/or the vibratory head 806. The first sensor 814, the second sensor 816, and any other sensors are all optional, however, such that in some examples the system 800 includes no such sensors at all.

As previously mentioned, the system 800 may be configured to permit wireless communication between the concrete vibrator 100 and one or more mobile or remote devices, such as a remote device 820 as illustrated in FIGS. 8-9. Thus, the concrete vibrator 100 (e.g., the controller 802 thereof) may include a transceiver configured to communicate with a transceiver that is part of the one or more remote devices 820. In some embodiments, the concrete vibrator 100 includes a Bluetooth™ transceiver configured to communicate with a Bluetooth™ transceiver of the remote device 820, and in one embodiment, the Bluetooth™ transceiver of the concrete vibrator 100 is included in the controller 802. In other embodiments, however, the concrete vibrator 100 and the remote device 820 may communicate via a protocol other than Bluetooth™ such as, for example, near field communication (NFC) or any other appropriate communication protocol. In some examples, the one or more remote devices 820 (or any of them) are configured to be hard wired to the concrete vibrator 100 in addition to or instead of wirelessly communicating therewith.

In various embodiments, the remote device 820 includes a processor 822, a memory 824, one or more sensors 826, and a user interface 828. The remote device 820 is not affixed to the concrete vibrator 100, but rather is freely movable with respect to the concrete vibrator 100. The processor 822 is operably connected to the memory 824, which is configured to store instructions to be executed on the processor 822. The one or more sensors 826 of the remote device 820 may include an integrated sensor such as, a temperature sensor, a humidity sensor, an atmospheric pressure sensor, an accelerometer, a multi-axis digital sensor that provides readings from a plurality of axes describing the angular orientation of the remote device, etc. Because the remote device 820 is not affixed to the structure of the concrete vibrator 100 (e.g., the motor housing 112), the sensors 826 may take readings at various locations, near or far, relative to the concrete vibrator 100 (and/or the vibratory head 806 thereof) that will positioned proximate to the concrete pour 818.

The remote device 820 may be various types of devices, including without limitation, smart phones, tablet devices, personal computers or laptops, various types of portable computing devices, various wearable electronics or activity trackers, various other mobile devices, various types of vehicle or equipment based user interfaces, etc. In some embodiments, the remote device 820 includes two (2) or more remote devices that each wirelessly communicate (simultaneously or otherwise) with the concrete vibrator 100. For example, the system 800 may include both a cellular phone (e.g., a smart phone) and a tablet device wirelessly connected to the concrete vibrator 100, the system 800 may include both a cellular phone wirelessly connected to the concrete vibrator 100 and a control device that is hard-wired to the concrete vibrator 100, etc.

Moreover, the system 800 may also include additional remote devices in wireless communication with the concrete vibrator 100 in addition to (or instead of) the remote device(s) 820. FIG. 8 illustrates an example where the system 800 includes a server 2830. The server 830 may be in wireless communication with the concrete vibrator 100, for example, to collect data, to provide software or firmware updates, etc.

However, where the system 800 includes one or more of the remote devices 820, the server 830 may also (or instead) be in wireless communication with any or all of the remote devices 820. For example, when the remote device 820 establishes a connection with the concrete vibrator 100, the remote device 820 may send an ID of the concrete vibrator 100 and an ID of the remote device 820 to the server 830. The server 830 may analyze the two (2) IDs to determine whether to grant or deny permission for the remote device 820 to deliver and/or receive data from the concrete vibrator 100. Accordingly, the server 830 may reply back to the remote device 820 with a grant/deny message, and/or send any updates as data to the concrete vibrator 100 using the remote device 820 as the communication pipeline.

As illustrated in FIG. 8, the system 800 may be configured to permit wireless communication via a network 840. In the illustrated embodiment, the remote device 820 wirelessly communicates with the concrete vibrator 100 via the network 840. Similarly, the server 830 and the concrete vibrator 100 may communicate over the network 840. Alternatively, direct wireless connections may be established between the concrete vibrator 100 and one or more of the remote devices 820 and/or the server 830 as illustrated in FIG. 9. Regardless of whether established directly (e.g., as in FIG. 9) or via the network 840 (e.g., as in FIG. 8), wireless communication between the concrete vibrator 100 and either or both of the remote device 820 and the server 830 may be achieved using a variety of technologies, including without limitation, BlueTooth™ or other nearfield or mid-range communication protocols, WiFi™ or other radio frequency communication technologies, cellular networks, etc.

Returning to FIG. 8, in some embodiments, the controller 802 includes a BlueTooth™ transceiver chip (not illustrated) such that the concrete vibrator 100 pairs with the remote device 820 over the network 840 (i.e., a BlueTooth™ network). In some embodiments, the controller 802 includes a WiFi™ transceiver chip (not illustrated) such that the concrete vibrator 100 communicates with the remote device 820 and/or the server 830 over the network 840 (i.e., a WiFi™ network). In some embodiments, the controller 802 includes a cellular or mobile network transceiver chip (not illustrated) such that the concrete vibrator 100 communicates with the remote device 820 and/or the server 830 over the network 840 (i.e., a cellular network). The controller 802 may include any or all of the foregoing BlueTooth™ transceiver chip, WiFi™ transceiver chip, and/or cellular or mobile network transceiver chip. Accordingly, the controller 802 may be configured to permit connecting the concrete vibrator 100 to the Internet and/or a cloud computer network. In these embodiments, additional remote devices or remote servers, such as the server 830, may communicate with the concrete vibrator 100 via the network 840, for example, to provide software updates, to facilitate maintenance, to communicate with the operator, to monitor usage of the concrete vibrator 100, to gather data from the concrete vibrator 100, etc.

As briefly described above, the controller 802, the remote device 820, and the additional remote devices, such as the server 830, may each contain (or be connected to) a transmitter and receiver (or a transceiver) to enable such communication over the network 840. The controller 802 receives motor operation data from the motor 804, including speed of the motor 804, voltage supplied to the motor 804, and/or other monitored parameters associated with operation of the motor 804, such as readings from the first and/or second sensors 814,816. The controller 802 may communicate such motor operation data to the remote device 820, which may then be used as input (or as additional input) for adjusting operation of the motor 804, or for diagnostic or other purposes. Similarly, the controller 802 and/or the remote device 820 may communicate such motor operation data to the server 830.

As described herein, the concrete vibrator 100 may be configured to provide various types of feedback, and the operator may utilize any of such feedback to optimize various concrete related activities. For example, operators may utilize feedback from the concrete vibrator 100 to optimize a concrete vibration operation, or the operator may utilize feedback to determine whether concrete being delivered (e.g., in a mixer or mixer truck) to a construction for a concrete pour has optimal characteristics. Moreover, operators may access such feedback instantaneously and, in many situations, at a construction site, which will allow them to make informed decisions as to whether to utilize a certain batch of cement before actually pouring the certain batch of cement.

The remote device 820 may include an application or "app" which provides certain functionality with respect to the concrete vibrator 100 and/or other components of the system 800 such as the server 840. The app may run in the foreground of the remote device 820 such that the user may interact with the app to actively control and monitor the concrete vibrator 100 and/or other aspects of the system 800. For example, the app may cause visual and/or audible information to be displayed or broadcast on the user interface 828 (e.g., the screen and/or speaker of a smart phone) of the remote device 820. Such visual and/or audible information may be representative of the operation of the concrete vibrator 100 and may include, for example, a graphical user interface with or without accompanying sound. In this manner, the user may control the concrete vibrator 100 as it imparts vibration into the concrete pour 818 and, moreover, monitor the quality of (and the effect of vibration imparted to) the concrete pour 818 in real time. In some embodiments, the app may run in the background of the remote device 820 such that the user of the remote device 820 may not be aware that the app is running. With the app running in the background, the remote device 820 will be able to connect to both the concrete vibrator 100, as well as any servers included in the system 800, without the user being aware of the connection and/or data communications/transfers occurring.

With respect to the operation of the remote device 820, the processor 822 thereof receives the motor operation data from the controller 802 and may determine motor control signals for the motor 804 based on how the app is programmed to interpret that motor operation data. For example, where the controller 802 monitors voltage and speed of the motor 804 and relates that information to the processor 822, the app may display a graphic to the user (e.g., a graph, index value score, etc.) and/or instruct the processor 822 to determine motor control signals for the motor 804 based on how the speed and voltage applied thereon vary over time during operation. In addition, the processor 822 may receive readings from the sensor 826 (of the remote device 820), the first sensor 814 (e.g., of the motor housing 112), and/or the second sensor 816 (e.g., of the vibratory head 806) and determine motor control signals for the motor 804 based on those readings (or modify control signals for the motor 804 based on those readings). Thus, for example, the motor control signals may be based upon motor operation data representative of the load on the motor 804, the speed exerted by the motor 804, and/or other parameters sensed by any of the sensors 814,816,826. The motor control signals may then be communicated to the controller 802 to cause the motor 804 to operate as directed, for example, to speed up or to speed down.

In some embodiments, the app is configured to take readings from the concrete vibrator 100 during operation and display information on the remote device 820 regarding that operation. The app may be configured to take readings at various intervals and, in one example, the app is configured to take five (5) readings per second. However, the app may be configured to take more or less than five (5) readings per second. The information gleamed from the app may be utilized for a variety of purposes. For example, the operator may utilize this information to determine when the vibratory head 806 has imparted sufficient vibration to the concrete pour 818. Moreover, the operator may utilize this information to assess the quality of various layers of concrete within a concrete lift.

Figure 10:
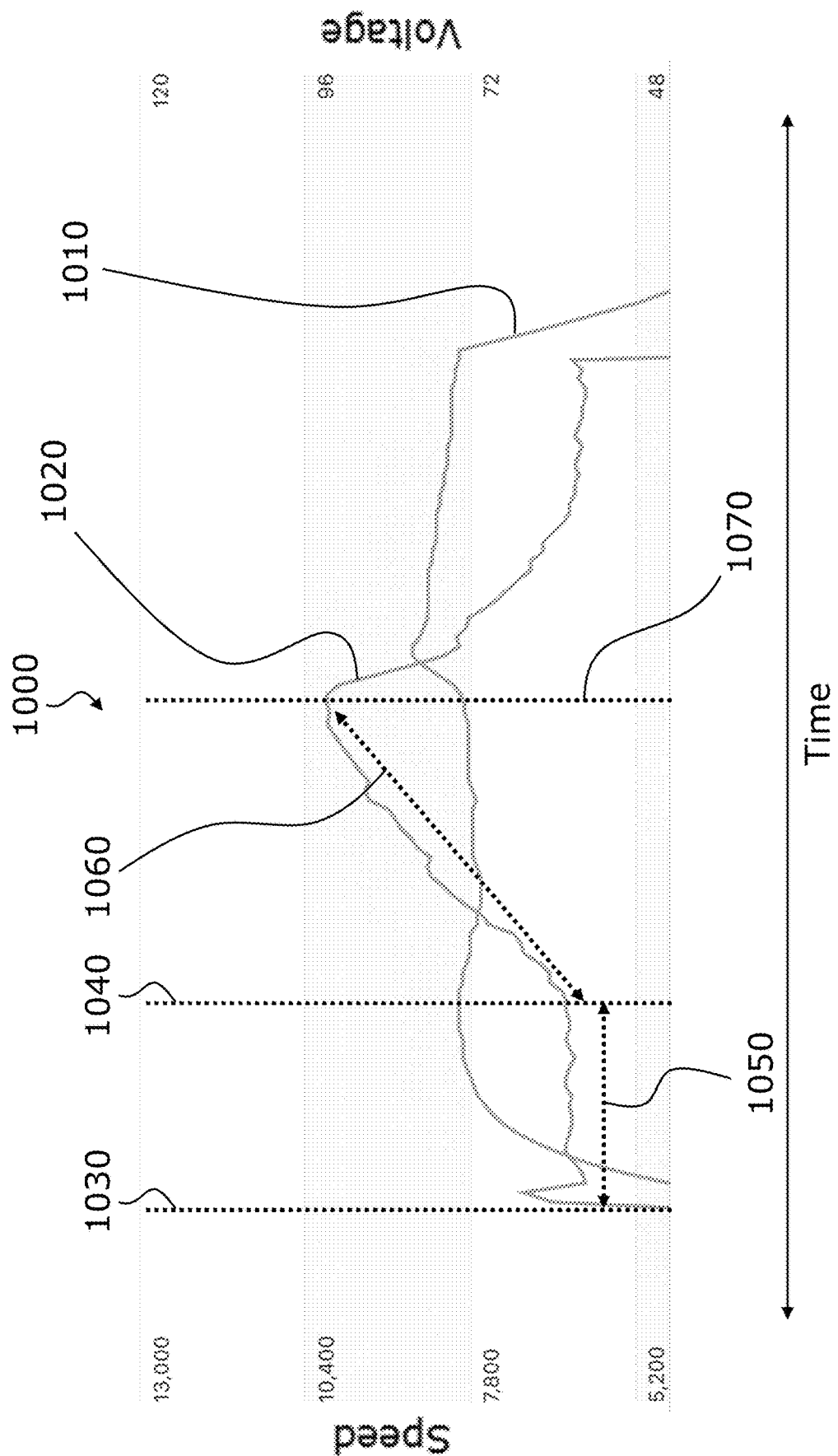
FIG. 10 is a hysteresis chart showing motor output speed and voltage supplied to the motor during an example operation, according to one or more embodiments.

In one embodiment, the app is configured to plot both voltage and speed of the motor 804 during operation. FIG. 10 illustrates a hysteresis chart 1000 that plots both output speed of and voltage supplied to the motor 804 during an example operation of the concrete vibrator 100, according to one or more embodiments. As illustrated, the hysteresis chart 1000 includes a speed curve 1010 and a voltage curve 1020. The speed curve 1010 represents the speed at which the motor 804 is driving the vibratory head 806 at any point during operation of the concrete vibrator 100, whereas the volt curve 1020 represents the voltage supplied to or utilized by the motor 804 to achieve the desired speed at any point during operation of the concrete vibrator 100.

Thus, the hysteresis chart 1000 logs the speed and voltage of the motor 804 during an example operation of the concrete vibrator 100. In this exemplary operation, the motor 804 of the concrete vibrator 100 is configured to operate at a certain or set speed when activated. However, when the vibratory head 806 is placed in the concrete pour 818, the cement will exert load on the vibratory head 806 and the motor 804 driving the vibratory head 806. This concrete load acts against the motor 804 and will decrease the speed output by the motor 804. To maintain the set speed, however, the motor 804 must overcome the concrete load. In the illustrated embodiment, the concrete load is overcome by increasing the voltage supplied to the motor 804. Thus, voltage supplied to the motor 804 may be increased to maintain and/or increase the speed output by the motor 804.

Concrete tends to become more workable as it is vibrated such that the load exerted by the concrete on the motor 804 is reduced. Thus, as concrete becomes more workable and exerts less concrete load on the motor 804, the speed of the motor 804 will increase and the voltage needed to achieve that speed will decrease. However, imparting too much vibration to concrete may damage the concrete, as too much vibration may cause separation of the concrete's ingredients. Thus, it is sometimes desirable to operate the motor 804 at a speed that corresponds with a resonant value of the concrete (i.e., removal of air without separation of material), and/or it may sometimes be desirable to operate the motor 804 at as low of a speed as possible and/or to impart as little vibration as possible for as short of a time as possible.

Operators may thus utilize feedback from the concrete vibrator 100, for example, in the form of the hysteresis chart 1000, to optimize concrete vibration applications in a number of manners. For example, operators may utilize the hysteresis chart 1000 to determine when concrete has been sufficiently vibrated, to determine how workable a particular concrete is, to determine how the concrete is performing in a particular vibration application, to determine whether the concrete mix needs more water, to determine whether the speed of the motor 804 is sufficient for a particular application (i.e., whether it should be increased or may be reduced), etc.

The hysteresis chart 1000 may be displayed on the remote device 820. Additionally, the app may incorporate data from the hysteresis chart 1000 into other graphical user interfaces and/or audible alerts on the remote device 820 and/or the server 830. For example, audible alerts may be triggered on any of the one or more remote devices 820 and/or on devices connected to the server 830 when the concrete achieves a certain quality of set of characteristics.

With regard to the example operation logged by the hysteresis chart 1000, the motor 804 was first activated to run at a set speed, as indicated by a first line 1030, before placing the vibratory head 806 in the concrete pour 818. Then, the vibratory head 806 was placed within the concrete pour 818, as indicated by a second line 1040. An interval 1050 extending between the activation of the motor 804 (i.e., the first line 1030) and the time when the vibratory head 806 was placed in the concrete pour 818 (i.e., the second line 1040) represents a period of time in which no load was applied to the motor 804 via the vibratory head 806 (e.g., in the form of the concrete load). Thus, the second line 1040 represents the time at which concrete load was applied to the motor 804, and that concrete load acted to decrease the speed output by the motor 804 as shown in the speed curve 1010 (i.e., the generally downward sloping portion of the speed curve 1010 illustrated after the second line 1040). Once concrete load was applied to the motor 804, voltage supplied to the motor 804 was increased to maintain the speed output (and/or to increase such decreased speed to reach the set speed) by the motor 804 as indicated by an upward sloping interval 1060 in the voltage curve 1020. During the upward sloping interval 1060, the vibratory head 806 imparts vibration to the concrete pour 818 without damaging or otherwise causing separation of the concrete ingredients, and the magnitude or length of the upward sloping interval 1060 will vary depending on the workability of the concrete. For example, the upward sloping interval 1060 will be relatively shorter when operating on workable concrete mixes, whereas the upward sloping interval 1060 will be relatively longer when operating on less workable or harder concrete mixes. This means that workable concretes may be vibrated for shorter periods of time at a certain speed as compared to harder concretes when vibrated at the same speed. The upward sloping interval 1060 ends when the concrete becomes suitably workable such that it no longer exerts enough concrete load to counter the ability of the motor 804 to operate at the set speed, thereby causing an increase in speed and decrease in voltage, as represented by a third line 1070. At the time represented by the third line 1070, the vibratory head 806 of the concrete vibrator 100 may be removed from the concrete pour 818 (or mixer) or, where the concrete vibrator 100 is utilized in a concrete lift application, the vibratory head 806 may be moved to a new lift for imparting vibration thereto.

Thus, various embodiments of the system 800 may provide the operator with feedback regarding performance and operation of the vibratory head 806 in a concrete pour (or concrete mixer) such that the operator may vary the motor 804 speed or take other actions to achieve the desired concrete characteristics. In some examples, the system 800 is configured as a closed loop feedback system that will measure the motor speed of the motor 804 and adjust the driving voltage applied to the motor 804 to either maintain a steady speed for a variable load or provide a variable speed for a fixed load. In some examples, the feedback may be associated with impedance or electrical current changes due to concrete load on the vibratory head 806 caused by the variability in concrete. With this feedback, it may be determined when the vibration energy is being transferred instead of absorbed in the concrete. The electrical current changes (impedance) may be compared to the non-destructive testing (resistivity) values or by empirically comparing the data to the concrete bleed. Electrical current differential data may be used to chart better resonant value versus the concrete bleed value and even time/cubic foot of energy.

To further optimize concrete pouring application, the concrete vibrator 100 may be utilized to gather information about various concrete mixes before construction or concrete pouring, for example, at pre-construction or pre-pour trials. These pre-construction or pre-pour trials may be conducted under various weather conditions and other conditions that may affect concrete quality, performance, or response to vibration. The data gathered from these pre-construction or pre-pour trials (i.e., reference data) may then be compiled and utilized as a reference to guide operation of the motor 804 during an actual operation such that the concrete vibrator 100 automatically imparts the ideal amount of vibration needed for a particular concrete mix (and at particular weather conditions, etc.). Also, reference data may be gathered and compiled from actual operation of one or more of the concrete vibrators. For example, one or more of the concrete vibrators 100 may be connected to the server 830, which downloads operational data from such those concrete vibrators 100 connected thereto, and such operational data may be added to one or more other reference data sets or utilized to create a unique set of operational data. For example, a unique set of reference data may be compiled from the unique operational data of a specific concrete vibrator 100, or a concrete vibrator 100 may utilize reference data that is not unique to that particular unit. The compiled reference data may be stored in a memory device of the concrete vibrator 100 and/or the remote device 820 and utilized to control speed output by the motor 804; and in some embodiments, the compiled reference data may be updated with newly gathered data and/or updated data when connected to the server 830. For example, the operator may manually download updated reference data (piecemeal or otherwise), or such updates may be automatically pushed to the memory of the concrete vibrator 100 and/or remote device 820. With this information the operator need not guess how fast to run the motor 804 and for how long and may monitor operation in real time to ensure a quality concrete mix is obtained.

Thus, the operation of the concrete vibrator 100 may be monitored and programmed to run at a compatible speed for a particular concrete type based on data obtained from pre-construction trials. Controlling speed output of the motor 804 in this manner may eliminate the higher motor speed ranges and may limit water separation in the flowable concrete mix designs. The motor 804 need not speed up in the concrete when concrete load is reduced, as such speed increase may result in damage to the concrete. This may result in less maintenance following vibration, for example, decrease in resulting large voids that otherwise would need to be chipped and patched to restore structural integrity. Thus, the concrete vibrator 100 may consolidate flowable mix designs and limit surface defects. This results in a concrete pour having a desired homogeneous state during placement as compared to the testing sample. The selection of a compatible motor speed for the concrete material selection, temperature, and additives may be compared against a sample for bleed or resistivity testing. The motor 804 may run at multiple speeds that may be selected/determined before construction (e.g., during test pours), and such speeds may be selected by taking into account any form of bleed testing available and the visual, empirical inspection of the concrete form faces on the structure. Moreover, the concrete vibrator 100 may score the quality of a particular cement mix, for example, where only concrete mixes having a certain pre-specified minimum score (or range of scores) may be suitable for a given project. Also, the concrete vibrator 100 may be configured identify the type of concrete mix in which it is operating by taking readings of that particular concrete mix and comparing it reference data that has been previously compiled by that particular concrete vibrator 100 (or a group of certain concrete vibrators) and/or reference data obtained elsewhere but accessible to the concrete vibrator 100 as described above.

Therefore, the disclosed systems and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope of the present disclosure. The systems and methods illustratively disclosed herein may suitably be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the elements that it introduces. If there is any conflict in the usages of a word or term in this specification and one or more patent or other documents that may be incorporated herein by reference, the definitions that are consistent with this specification should be adopted.

The terms "inward" and "outward" are defined herein relative to a caged concrete vibrator or concrete vibrator pod having a motor therein configured to mechanically drive a vibratory head that extends from the pod. The term "inward" refers to the position of an element closer to the caged concrete vibrator or concrete vibrator pod and the term "outward" refers to the position of an element further away from the caged vibrator motor system or concrete vibrator pod. Moreover, the use of directional terms such as above, below, upper, lower, upward, downward, left, right, and the like are used in relation to the illustrative embodiments as they are depicted in the figures, the upward or upper direction being toward the top of the corresponding figure and the downward or lower direction being toward the bottom of the corresponding figure.

As used herein, the phrase "at least one of" preceding a series of items, with the terms "and" or "or" to separate any of the items, modifies the list as a whole, rather than each member of the list (i.e., each item). The phrase "at least one of" allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

What is claimed is:

1. A system for controlling speed of a concrete vibrator comprising:
  a controller affixed to the concrete vibrator and operable to control the motor speed of the concrete vibrator; and
  a remote device configured to communicate with the controller to control motor speed of the concrete vibrator based on the readings received from the controller, wherein the remote device is configured to set an operating speed of the concrete vibrator and the controller is configured to adjust voltage supplied to the concrete vibrator to maintain the operating speed set in the remote device, and wherein the readings received from the controller include voltage draw of the concrete vibrator and/or actual motor speed of the concrete vibrator, and wherein the remote device displays the readings.

2. The system of claim 1, wherein the remote device includes at least one remote sensor that provides remote readings to the remote device.

3. The system of claim 2, wherein the remote device is configured to control motor speed of the concrete vibrator based on at least one of readings received from the controller and remote readings received from the at least one remote sensor.

4. The system of claim 1, wherein the concrete vibrator includes at least one sensor that provides readings to the remote device.

5. The system of claim 4, wherein the remote device is configured to control motor speed of the concrete vibrator based readings received from at least one of the controller and at least one sensor of the concrete vibrator.

6. The system of claim 1, wherein the controller is configured to increase motor torque in response to increase in voltage draw of the concrete vibrator.

7. The system of claim 1, wherein the controller is configured to increase motor speed to match a specified speed in response to increase in voltage draw of concrete vibrator.

8. The system of claim 1, wherein the remote device is configured to communicate wirelessly with the controller.

9. The system of claim 8, further comprising a server configured to communicate wirelessly with at least one of the controller and the remote device.

10. The system of claim 1, further comprising a server configured to communicate wirelessly with the controller.

11. The system of claim 10, wherein the server is configured download operational data from the concrete vibrator.

12. The system of claim 1, further comprising one or more additional remote devices.

13. The system of claim 12, wherein at least one of the one or more additional remote devices is configured to communicate wirelessly with the controller.

14. The system of claim 12, wherein the remote device is configured to communicate wirelessly with the controller and at least one of the one or more additional remote devices is in wireless communication with the controller.

15. The system of claim 12, wherein at least one of the one or more additional remote devices is a server configured to communicate wirelessly with the controller.

16. The system of claim 1, wherein the remote device is selected from the group consisting of a smart phone, a tablet, a laptop, a personal computer, a server, a wearable electronic device, an activity tracker, a vehicle based control device, a wired control device, and combinations of the same.

17. The system of claim 1, wherein the remote device is operable to permit initiation of a concrete vibration operation.

18. The system of claim 17, wherein the remote device is configured to display real time information indicative of the concrete vibration operation.

19. The system of claim 1, wherein the remote device includes a processor configured to receive drive voltage readings and motor speed readings from the controller and communicate motor control signals to the controller to adjust motor speed based on at least one of the drive voltage readings and motor speed readings.

20. The system of claim 1, wherein the remote device includes
a user interface operable to permit initiation of a concrete vibration operation; and
and a processor configured to receive drive voltage readings and motor speed readings from the controller and communicate motor control signals to the controller to adjust motor speed based on at least one of the drive voltage readings and motor speed readings.

21. The system of claim 20, wherein the remote device further includes a memory configured to store instructions to be executed by the processor to perform the vibration operation.

22. The system of claim 20, wherein the user interface is configured to display real time information indicative of the concrete vibration operation.

23. The system of claim 22, wherein the real time information includes a graphic of drive voltage and motor speed over time.

24. The system of claim 1, wherein the remote device is operable to generate an alert upon detection of an increase in actual motor speed and a decrease in voltage draw.

25. The system of claim 1, wherein the remote device is operable to generate a speed curve based on the actual motor speed and a voltage curve based on the voltage draw of the concrete vibrator, and wherein the remote device is configured to determine concrete suitability upon detection of an increase in actual motor speed and a decrease in voltage draw.

26. A concrete vibrator, comprising:
a motor assembly operatively connected to a vibratory head;
a controller affixed to the motor assembly, wherein the controller applies a drive voltage to the motor assembly and is operable to control motor speed output by the motor assembly based on both the drive voltage fluctuations and the motor speed monitored by the controller; and
a remote device configured to communicate with the controller to control motor speed of the motor assembly based on the drive voltage readings received from the controller, and wherein the remote device displays the drive voltage readings.

27. The system of claim 26, wherein the controller is configured to increase motor speed output by the motor assembly in response to increase in drive voltage.

28. The system of claim 26, wherein the remote device includes a processor configured to receive drive voltage readings and motor speed readings from the controller and communicate motor control signals to the controller to adjust motor speed based on at least one of the drive voltage readings and motor speed readings.

29. The system of claim 28, wherein the remote device further includes a memory configured to store instructions to be executed by the processor to perform the vibration operation.

30. The system of claim 29, wherein the instructions stored on the memory are based a comparison between a reference data and the drive voltage readings and motor speed readings.

31. The system of claim 30, further comprising a server in wireless communication with at least one of the controller and the remote device, wherein the server is configured to update the reference data.

32. The system of claim 31, wherein the server is configured download operational data from the concrete vibrator and the reference data is compiled from operational data.

* * * * *